United States Patent [19]

Marion et al.

[11] 4,394,137

[45] * Jul. 19, 1983

[54] PARTIAL OXIDATION PROCESS

[75] Inventors: Charles P. Marion, Mamaroneck; William B. Crouch, Chappaqua; Albert Brent, Huntington, all of N.Y.; George N. Richter, San Marino, Calif.; Edward T. Child, Tarrytown, N.Y.; Blake Reynolds, Riverside, Conn.

[73] Assignee: Texaco, Inc., White Plains, N.Y.

[*] Notice: The portion of the term of this patent subsequent to Sep. 28, 1999, has been disclaimed.

[21] Appl. No.: 272,420

[22] Filed: Jun. 10, 1981

Related U.S. Application Data

[63] Continuation-in-part of Ser. No. 212,054, Dec. 3, 1980, Pat. No. 4,371,378, which is a continuation-in-part of Ser. No. 167,876, Jul. 14, 1980, Pat. No. 4,351,645, which is a continuation-in-part of Ser. No. 107,215, Dec. 26, 1979, Pat. No. 4,338,099.

[51] Int. Cl.³ .................................................. C10J 3/46
[52] U.S. Cl. .................................... 48/197 R; 48/206; 48/212; 48/215; 48/DIG. 7; 252/373
[58] Field of Search ...................... 48/197 R, 200, 201, 48/203, 206, 209, 210, 212, DIG. 7, 180 C, 180 P, 180 R; 252/373; 431/2, 6, 11, 12, 90; 137/9

[56] References Cited

U.S. PATENT DOCUMENTS

| | | | |
|---|---|---|---|
| 3,418,062 | 12/1968 | Hovis et al. | 431/350 |
| 3,607,156 | 9/1971 | Schliger | 252/373 |
| 3,995,942 | 3/1976 | Marion et al. | 252/373 |
| 4,111,637 | 9/1978 | Hillman | 137/113 |
| 4,113,445 | 9/1978 | Gelbert et al. | 252/373 |
| 4,277,254 | 7/1981 | Hanson | 48/180 C |

Primary Examiner—Peter F. Kratz
Attorney, Agent, or Firm—Carl G. Ries; Robert A. Kulason; Albert Brent

[57] ABSTRACT

A partial oxidation process for continuously producing synthesis gas, fuel gas or reducing gas in which process one fuel is replaced by a differing fuel without shutting down or depressurizing the gas generator. This multifuel process is not tied to one particular fuel and reacts slurries of solid carbonaceous fuel and/or liquid or gaseous hydrocarbonaceous fuels. Problems of fuel availability are reduced due to the wide selection of fuels that are suitable for the subject process. A two-section burner having a high turndown feature is employed that comprises a central conduit; a central bunch of tubes positioned in said central conduit; an outer conduit coaxial with said central conduit and forming an annular passage therewith; and an annular bunch of tubes positioned in said annular passage. The downstream ends of said central and/or annular bunches of tubes are respectively retracted upstream from the burner face a distance of about 0 to 12 i.e. 3 to 10 times the minimum diameter of the central exit orifie and the minimum width of the annular exit orifice. A control system is provided for switching the type of reactant fuel streams flowing through either one or both sections of the burner. The flow rates of the oxidant, fuel, and temperature moderator streams may also be varied in either one or both sections of the burner, thereby effecting a rapid turndown or turnup of the burner and a change in the production of the effluent gas.

20 Claims, 2 Drawing Figures

PARTIAL OXIDATION PROCESS

This application is a continuation-in-part of application Ser. No. 212,054, filed on Dec. 3, 1980, now U.S. Pat. No. 4,371,378 which application is a continuation-in-part of application Ser. No. 167,876 filed July 14, 1980, now U.S. Pat. No. 4,351,645, which application is a continuation-in-part of application Ser. No. 107,215 filed Dec. 26, 1979, now U.S. Pat. No. 4,338,099.

BACKGROUND OF THE INVENTION

1. Field of the Invention

This invention relates to the manufacture of gaseous mixtures comprising $H_2$ and CO, e.g., synthesis gas, fuel gas, and reducing gas by the partial oxidation of pumpable slurries of solid carbonaceous fuels in a liquid carrier and/or liquid or gaseous hydrocarbon fuels. In one of its more specific aspects, the present invention pertains to switching from one type of fuel to another without interruption by employing an improved two-section burner.

2. Description of the Prior Art

In the operation of a partial oxidation synthesis gas generator when the principal fuel becomes unavailable or in short supply and it is desired to operate the gas generator with a substitute or stand-by fuel, then previously it was necessary to depressurize the system and shut down the gas generator while the burner is changed and other adjustments are made to the system to provide for the new fuel. By the subject process, such costly down-time is avoided.

Annulus-type burners have been employed for introducing liquid hydrocarbonaceous fuels into a partial oxidation gas generator. For example, coassigned U.S. Pat. No. 3,528,930 shows a single annulus burner, and coassigned U.S. Pat. Nos. 3,758,037 and 3,847,564 show double annulus burners. To obtain proper mixing, atomization, and stability of operation a burner is sized for a specific throughput. Should the required output of product gas change substantially, with prior-art burners, shut-down of the system is required in order to replace the prior-art burner with one of proper size. This problem is avoided and costly shut-downs are avoided by the subject two-compartment burner which will operate at varying levels of output while retaining efficiency and stability. The more complex process for preheating a gas generator by means of a preheat burner, removing the preheat burner from the gasifier, and inserting a separate production burner is described in coassigned U.S. Pat. No. 4,113,445.

SUMMARY OF THE INVENTION

A partial oxidation process for continuously producing synthesis gas, fuel gas or reducing gas while changing from one type of fuel to another without shutting down or depressurizing the gas generator is described. This multifuel process is not tied to one particular fuel and reacts slurries of solid carbonaceous fuel and/or liquid or gaseous hydrocarbonaceous fuel. Problems of fuel availability are reduced due to the wide selection of fuels that are suitable for the subject process. By the subject process the total output from the partial oxidation gas generator may be maintained substantially constant while the feed is changed from one fuel to another. A novel two-compartment burner having a high turndown feature is employed. The burner comprises: a central conduit that terminates in an unobstructed circular exit orifice at the burner face; a central bunch of tubes supported within said central conduit with downstream ends retracted upstream from the burner face a distance of about 0 to 12 times i.e. 3 to 10 times the minimum diameter of the central conduit exit orifice; an outer conduit coaxial with said central conduit and forming an annular passage therewith that terminates in an unobstructed annular orifice at the burner face; and an annular bunch of tubes supported within said annular passage with downstream ends retracted upstream from the burner face a distance of about 0 to 12 times i.e. 3 to 10 times the minimum width of the annular exit orifice.

The subject invention pertains to a method for producing gaseous mixtures comprising $H_2$, CO, $CO_2$, entrained particulate carbon and at least one material from the group consisting of $H_2O$, $N_2$, $H_2S$, COS, $CH_4$, $A_r$, and ash in a free-flow noncatalytic partial oxidation gas generator including the improvement employing a two-section burner having a central section with first and second fluid passage means and an annular section with third and fourth fluid passage means and changing from one reactant fuel stream going into the reaction zone of said gas generator to another without shutting down or depressurizing the system. At the time that the fuel change commences, the first fuel stream may be passing through one or both sections of the burner. The subject process comprises the steps of:

(1) passing a first reactant stream of first solid carbonaceous fuel slurry or hydrocarbonaceous fuel with or without mixture with $H_2O$ through either the first or second fluid passage means in the central section of said burner, and/or simultaneously passing a second reactant stream of said first solid carbonaceous fuel slurry or hydrocarbonaceous fuel with or without mixture with $H_2O$ through either the third or fourth fluid passage means in the annular section of said burner;

(2) simultaneously passing a separate reactant stream of free-oxygen containing gas with or without mixture with a temperature moderating gas through the unused fluid passage means in each of the central and/or annular sections of said burner which are related to said fluid passage means through which said stream(s) of first solid carbonaceous fuel slurry or hydrocarbonaceous fuel with or without mixture with $H_2O$ are passing;

(3) mixing together said reactant streams from (1) and (2) to produce a well-distributed blend, and reacting said mixtures by partial oxidation in the reaction zone of said gas generator at an autogenous temperature in the range of about 1700° to 3500° F., a pressure in the range of about 1 to 300 atmospheres, an atomic ratio of oxygen/carbon in the range of about 0.5 to 1.7, and a weight ratio $H_2O$/fuel in the range of about 0 to 5.0;

(4) replacing in said central and/or annular section(s) one or more of said reactant stream(s) of first solid carbonaceous fuel slurry or hydrocarbonaceous fuel with or without mixture with $H_2O$ with a replacement stream of a second carbonaceous fuel slurry or hydrocarbonaceous fuel with or without mixture with $H_2O$; and simultaneously with or after completion of (4)

(5) controlling the temperature and weight ratio $H_2O$/fuel in the reaction zone at design conditions by adjusting the flow rate(s) of the reactant stream(s) of free-oxygen containing gas with or without mixture with a temperature moderating gas passing through the burner, and if necessary introducing supplemental $H_2O$ into the reaction zone.

Manual or automatic control means are described for switching, controlling and computing the fuel, oxidant, and steam streams. By this means, the throughput levels of principal and stand-by fuels, oxidant, and temperature moderator streams through one or both sections of the subject burner may be controlled or up or down—to produce many levels of gasifier output while retaining efficiency and stability.

BRIEF DESCRIPTION OF THE DRAWING

In order to illustrate the invention in greater detail, reference is made to several embodiments as shown in the figures of the drawing wherein.

DESCRIPTION OF THE INVENTION

The present invention pertains to a continuous process for the manufacture of gas mixtures comprising $H_2$, CO, $CO_2$, particulate carbon and at least one material selected from the group consisting of $H_2O$, $N_2$, $A_r$, $CH_4$, $H_2S$, COS, and ash such as synthesis gas, fuel gas, and reducing gas, by the partial oxidation of one reactant stream of fuel which is then replaced by a different reactant stream of fuel without shutting down or depressurizing the gas generator. Further, there may be substantially no change in the amount of gas produced. This multifuel process is not restricted to one particular fuel. Problems of fuel availability are reduced. The two reactant fuel streams may be selected from the group consisting of a pumpable slurry of solid carbonaceous fuel in a liquid carrier, liquid or gaseous hydrocarbonaceous fuel, and mixtures thereof with or without admixture with a temperature moderator. The fuels are reacted by partial oxidation with a reactant stream of free-oxygen containing gas with or without admixture with a temperature moderator. The product gas mixture is produced in the reaction zone of a noncatalytic, refractory-lined, free-flow partial oxidation gas generator, such as described in coassigned U.S. Pat. No. 2,809,104 issued to Dale M. Strasser et al at a temperature in the range of about 1700° to 3500° F. and a pressure in the range of about 1 to 300 atmospheres, such as about 5 to 250 atmospheres, say about 10 to 100 atmospheres.

During operation of the partial oxidation gas generator, it may be necessary to rapidly turndown the production of the effluent gas to about $\frac{1}{8}$ to $\frac{3}{4}$ of the plant-design output, without replacing the burner. Changing the burner requires a costly shut-down period with resultant delay. Thus, in combined cycle operation for power generation a durable burner is required which offers minimum pressure drop and with which throughput levels may be rapidly changed —up and down—without sacrificing stable operation and efficiency. Further, the burner should operate with a variety of liquid, solid, and gaseous fuels, and mixtures thereof. Combustion instability and poor efficiency can be encountered when prior art burners are used for the gasification of liquid phase slurries of solid carbonaceous fuels. Further, feedstreams may be poorly mixed and solid fuel particles may pass through the gasifier without contacting significant amounts of oxygen. Unreacted oxygen in the reaction zone may then react with the product gas.

These problems and others are avoided by the novel two-section burner employed in the subject process comprising: a central conduit, said central conduit being closed at the upstream end and having a downstream circular exit orifice at the tip of the burner; an outer conduit coaxial and concentric with said central conduit and forming an annular passage therebetween, said outer conduit and annular passage being closed at the upstream end and having a downstream annular exit orifice at the tip of the burner; a central bundle of open-ended parallel or helical tubes passing through the closed end of said central conduit and making a gas tight seal therewith; means for supporting said central bundle of parallel or helical tubes so that the external surfaces of said central bundle of parallel or helical tubes forms a plurality of passages within said central conduit; upstream inlet means including a manifold for splitting and introducing a first reactant feedstream into the upstream ends of said central bundle of parallel or helical tubes; and wherein the downstream ends through which said first feedstream is discharged are retracted upstream from the burner face a distance of 0 to 12 say about 3 to 10 times the minimum diameter of the central conduit exit orifice at the tip of the burner; upstream inlet means for introducing a second reactant feedstream into said central conduit and down through said plurality of passages within said central conduit; an annular bundle of open-ended parallel or helical tubes passing through the closed end of said annular passage and making a gas tight seal therewith, so that the external surfaces of said annular bundle of parallel or helical tubes forms a plurality of passages within said annular passage; upstream inlet means including a manifold for splitting and introducing a third reactant feedstream into the upstream ends of said annular bundle of parallel or helical tubes, and wherein the downstream tube ends through which said third reactant feedstream is discharged are retracted upstream from the burner face a distance of 0 to 12 say about 3 to 10 times the minimum width of the annular exit nozzle at the tip of the burner; means for supporting said annular bundle of parallel or helical tubes with respect to the inside wall of said annular passage and to each other so that the external surfaces of said annular bundle of parallel or helical tubes forms a plurality of passages within said annular passage; and upstream inlet means for introducing a fourth reactant feedstream into said annular passage and down through said plurality of passages within said annular passage.

Advantageously, by means of the subject burner, three ranges of flow through the burner may be obtained by using one or both bunches of tubes and their surrounding conduits. Throughput levels may be rapidly changed—up and down—without sacrificing stable operation.

In one embodiment of the aforesaid burner in which the downstream ends of the central and/or annular bundles of parallel or helical tubes are retracted upstream from the burner face, additional mixing of the feedstreams may be obtained by providing at least one coaxial cylindrical shaped pre-mix chambers in series in said central conduit in which said first and second feedstreams are mixed, and/or at least one coaxial annular shaped pre-mix chambers in series in said annular passage in which said third and fourth feedstreams are mixed.

The burner may be provided with a plurality of longitudinal gas conduits parallel to the burner axis and radially spaced between said central conduit and said annular passage. Said gas conduits are closed at the downstream end near the burner tip and are connected to a gaseous feedstream at the upstream end. A plurality of feeder lines connect said gas conduits to said pre-mix chambers in said central conduit and/or to said annular passage. A gaseous feedstream selected from the group consisting of steam, free-oxygen containing gas, $CO_2$, $N_2$, fuel gas, a recycle portion of the product gas, and mixtures thereof may be thereby passed through said longitudinal gas conduit and feeder lines and into said pre-mix chambers to improve mixing, break-up packed passages, or to introduce a gaseous constituent which will influence the reaction going on in the gasifier.

The fuel may be passed through either the central and/or annular bundle(s) of tubes, or alternatively through the conduit(s) surrounding the tubes in the central and/or annular sections of the burner. Simultaneously the free-oxygen containing gas is passed through the corresponding unoccupied passages in the central and/or annular sections of the burner. In one embodiment, one type of fuel is passed through one section of the burner i.e. central or annular section, while a second type of fuel is passed through the remaining section of the burner.

Preferably, in the subject two-section burner said first and third reactant feedstreams and said second and fourth reactant feedstreams are respectively made up of split streams from the fuel stream(s), and the gaseous oxidant stream. By this means, fuel is passed through the central and annular bundles of tubes, while simultaneously free-oxygen containing gas is passed through the corresponding central and annular conduits. In one embodiment, however, the first and fourth feedstreams, and the second and third feedstreams are respectively made up of split streams from the fuel stream(s), and the stream of gaseous oxidant. By this means, fuel is passed through the central bundle of tubes and the annular conduit, while simultaneously free-oxygen containing gas is passed through the corresponding central conduit and annular bundle of tubes.

Flow control means are provided in the subject process for controlling the introduction of said reactant feedstreams into the burner. Further, means are provided for changing fuels without shutting down or depressurizing the gas generator.

When the principal fuel is flowing through the tubes or surrounding passages in the central and/or annular sections of the burner, some preferred embodiments of the subject process for replacing the principal fuel with the stand-by fuel follow:

(1) the replacement of the principal fuel with the stand-by fuel may take place simultaneously in the central and/or annular sections of the burner.

(2) alternatively, fhe replacement of the principal fuel with the stand-by fuel may take place sequentially, and first in either one of the sections of the burner. This is then followed by the substitution of the fuels in the remaining section of the burner.

When a stream of the principal fuel is flowing through only one section of the burner and the other section is unused, then first a stream of the stand-by fuel may be introduced into the unused section of the burner. The principal fuel may be stopped in the section in which it is flowing along with the related stream of free-oxygen containing gas with or without mixture with a temperature moderating gas. The principal fuel stream may be stopped simultaneously with or after the introduction of the stand-by fuel stream. In such case, after the stand-by fuel replaces the principal fuel only one section of the two-section burner is in use. Alternatively, the principal fuel may be also replaced in the section in which it was originally flowing by a stream of said seccond solid carbonaceous fuel slurry or hydrocarbonaceous fuel. In such case, after the stand-by fuel replaces the principal fuel both sections of the burner are in use.

In the above schemes, the principal and/or stand-by fuels may or may not be in admixture with $H_2O$. Adjustments are made to the free-oxygen containing gas stream with or without mixture with a temperature moderating gas flowing in the tubes or surrounding passages that are related to the corresponding surrounding passages or tubes in which the fuel stream is flowing and if necessary supplemental $H_2O$ is introduced into the reaction zone so as to maintain the weight ratio of the $H_2O$ to fuel and the temperature in the reaction zone at design conditions. For example, the temperature in the reaction zone may be maintained substantially constant i.e. less than $\pm 200°$ F. variation; and, the weight ratio $H_2O$/fuel in the reaction zone may be maintained in the range of about 0.2-3.0.

Thus, if the principal or first fuel flowing through a first or second fluid passage in the central or first section of the burner and/or through the third or fourth fluid passage in the annular or second section of the burner becomes unavailable and it is desired to switch to a stand-by or second fuel, or for any reason whatsoever it is desired to switch from a first solid carbonaceous fuel slurry or hydrocarbonaceous fuel to a second solid carbonaceous fuel slurry or hydrocarbonaceous fuel, one may proceed as follows:

(1) passing a first reactant stream of first solid carbonaceous fuel slurry or hydrocarbonaceous fuel with or without mixture with $H_2O$ through either the first or second fluid passage means in the central or first section of said burner, and/or simultaneously passing a second reactant stream of said first solid carbonaceous fuel slurry or hydrocarbonaceous fuel with or without mixture with $H_2O$ through either the third or fourth fluid passage means in the annular or second section of said burner;

(2) simultaneously passing a separate reactant stream of free-oxygen containing gas with or without-mixture with a temperature moderating gas through the unused fluid passage means in each of the central and/or annular sections of said burner which are related to said fluid passage means through which said stream(s) of first solid carbonaceous fuel slurry or hydrocarbonaceous fuel with or without mixture with $H_2O$ are passing;

(3) mixing together said reactant streams from (1) and (2) to produce a well-distributed blend, and reacting said mixtures by partial oxidation in the reaction zone of said gas generator at an autogenous temperature in the range of about 1700° to 3500° F., a pressure in the range of about 1 to 300 atmospheres, an atomic ratio of oxygen/carbon in the range of about 0.5 to 1.7, and a weight ratio $H_2O$/fuel in the range of about 0 to 5.0;

(4) replacing in said central and/or annular section(s) one or more of said reactant stream(s) of first solid carbonaceous fuel slurry or hydrocarbonaceous fuel with or without mixture with $H_2O$ with a replacement stream of a second carbonaceous fuel slurry or hydrocarbonaceous fuel with or without mixture with $H_2O$; and simultaneously with or after completion of (4)

(5) controlling the temperature and weight ratio $H_2O$/fuel in the reaction zone at design conditions by adjusting the flow rate(s) of the reactant stream(s) of free-oxygen containing gas with or without mixture with a temperature moderating gas passing through the burner, and if necessary introducing supplemental $H_2O$ into the reaction zone.

For example, by means of the subject process the temperature in the reaction zone may be maintained substantially constant i.e. a variation of less than ±200° F., and the weight ratio $H_2O$/fuel may be maintained in the range of about 0.2 to 3.0.

In another embodiment of the subject process, the principal fuel is phased out and the stand-by fuel is phased into the burner. This embodiment would include steps (1) to (5) of the previous embodiment and provided with the additional steps in (4) of phasing out of the fluid passage means in which it is flowing in said central and/or annular section(s) said stream(s) of first solid carbonaceous fuel slurry or hydrocarbonaceous fuel with or without mixture with $H_2O$, said phasing out being with a uniformly decreasing rate of flow that varies from maximum to 0 over a period of time in the range of about 1–3600 seconds; and simultaneously phasing said stream(s) of second solid carbonaceous fuel slurry or hydrocarbonaceous fuel with or without mixture with $H_2O$ into the same fluid passage means at a uniformly increasing rate of flow that varies from 0 to maximum rate over the same period of time and mixing with the remaining portion of and replacing the phased out portion of said stream of first solid carbonaceous fuel slurry or hydrocarbonaceous fuel with or without mixture with $H_2O$ flowing therein.

In the subject flow control means a manual or automatically controlled fluid-controller is placed in each feed line. For slurry fuel feed lines, a signal from the controller is transmitted to a speed control for a positive displacement pump. For liquid or gaseous hydrocarbon fuel feed lines and for oxidant feed lines, the signal from the controller is transmitted to a flow control valve. Responsive to said signal(s), the speed of said pump(s) is varied, or alternatively the opening in said flow control valve(s) is changed. By this means, the flow rate for the streams of fuel and/or oxidant passing through the burner may be adjusted up or down, say up to about 50% of the Design Conditions. Alternatively, a flow control valve may be inserted in each of the feedstreams to start or stop the flow of the feedstreams to the central conduit and/or the annular passage and to their respective bundles of tubes. By this means, three ranges of flow through the burner may be obtained. Further, both of these flow control schemes may be combined.

By means of the subject burner a large volume of the first reactant stream is split into a plurality of separate streams of reactant fluid flowing through the central bunch of helical or parallel tubes. This permits the introduction of the second stream of reactants passing concurrently through the central conduit into the interstices and/or passages surrounding the central bunch of helical or parallel tubes. Similarly, a large volume of the third reactant stream is split into a plurality of separate streams of reactant fluid flowing through the annular bunch of helical or parallel tubes. The fourth stream of reactants passing concurrently through the annular passage is introduced into the interstices and/or passages surrounding the annular bunch of helical or parallel tubes. The greater the number of tubes in a bunch, the better the distribution of one reactant within the other reactant. The mixing of the reactant streams which takes place downstream of the ends of the tubes is facilitated by this improved distribution. Such efficient mixing of the feedstreams facilitates a more uniform partial oxidation of the fuel to produce $H_2$ and CO. The combustion efficiency of the process is thus increased.

By means of the subject invention, reactions are made to proceed in local regions where there is less opportunity for overheating the fuel with an insufficient supply of oxygen to result in the formation of soot. Thus, the amount of unconverted particulate carbon produced for a given oxygen to carbon atomic ratio in the feed may be substantially reduced. Further, "overburning" of the fuel to produce carbon dioxide is substantially reduced. The subject burner is preferably made from heat and corrosion-resistant metal alloys.

The velocity of the reactant stream through the central and annular bunches of tubes, or alternatively through the central conduit or annular passage surrounding said tubes is in the range of about 5–100, say 10–50 feet per second at the face of the burner when said reactant stream is a liquid hydrocarbon fuel or liquid slurry of solid carbonaceous fuel, or mixtures thereof, and in the range of about 150 feet per second to sonic velocity, say 200–500 feet per second when said reactant stream is a gaseous hydrocarbon fuel or a free-oxygen containing gas with or without admixture with a temperature moderator. The velocity of a stream of reactant fuel or a stream of a mixture of reactant fuels exceeds the flame propagation velocity for that fuel or fuel mixture.

The central bunch of tubes may number in the range of about 1–200 or more, such as about 2–180 say about 4–48. The annular bunch of tubes may number in the range of about 1–600, or more, such as about 2–580, say about 8–108. There may be 1 to 7 or more concentric rings of tubes in the central and/or annular bundles.

The ratio of the total tube cross-sectional area (basis inside diameter) for the annular bunch of tubes ($T_A$) to the total tube cross-sectional area (basis inside diameter) for the central bunch of tubes ($T_C$) may be in the range of about 2–8. Similarly, the ratio of the annular interstitial cross-sectional area ($I_A$) surrounding the annular bunch of tubes to the central interstitial cross-sectional area ($I_C$) surrounding the central bunch of tubes may be in the range of about 2–8.

The inside diameter of the tubes in either bunch may range from about 1/16 to 2 inches in diameter. The length of the tubes in the central and annular bunches and their spacing are such as to permit the external reactant stream to flow evenly into the interstices between the tubes. For example, the length of the tubes or the height of the coils in either tue bundle may range from about ½ to 36 inches or longer and preferably from about 4 to 12 inches, with greater lengths required as the number of tubes and the total size of the burner increases. Preferably, the ratio of the length to inside diameter of the tubes should be at least 8. Preferably, the inside diameter and the length of each tube should be the same for all tubes in the central bunch or the annular bunch. By this means equal flow may be obtained through all of the tubes.

Alignment pins, fins, centering vanes, spacers and other conventional means are used to symmetrically space the tubes and conduits with respect to each other and to hold same in stable alignment without obstructing the free-flow of the feedstreams in the central and annular interstitial zones.

The downstream exit ends of the plurality of annular and central bunches of parallel tubes terminate in the same plane perpendicular to the longitudinal central axis of the burner. In one embodiment employing premix chambers, to be further described, the ends of the central and/or annular bunch of tubes are retracted upstream from the burner face to provide substantial mixing of the reactants and volatilization of the slurry medium prior to discharge.

The central conduit exit orifice and/or the annular exit orifice may have converging sections. For example, the central conduit exit orifice may comprise a frusto-conical rear portion having a converging angle in the range of about 15° to 90° from the central longitudinal axis of the burner. The rear portion may develop into a normal cylindrical front portion which terminates at the downstream face of the burner. The cyindrical front portion may have a height in the range of about 0 to 1.5 times its own diameter.

In one embodiment the first conduit downstream outlet comprises a converging frusto-conical rear portion that develops into a diverging frusto-conical front portion that terminates at the downstream tip of the burner. The converging and diverging angles are in the range of about 15° to 90° with the central longitudinal axis of the burner.

Similarly, said annular exit orifice may comprise a generated converging frusto-conical shaped annular rear portion having a converging angle in the range of about 15° to 90° from the central axis of the frusto-conical section, said central axis being parallel to the central longitudinal axis of the burner. The rear portion may develop into a generated normal cylindrical annular front portion which terminates at the downstream face of the burner. The cylindrical front portion may have a height in the range of about 0 to 1.5 times its own width.

In one embodiment, the central conduit exit orifice and/or the annular exit orifice are in the shape of or is generated by an American Society of Mechanical Engineer's standard long-radius nozzle. A further description of said nozzle may be found in "Thermodynamics Fluid Flow and Heat Transmission" by Huber O. Croft. page 155, First Edition, 1938 McGraw-Hill Book Company.

The burner may be cooled on the outside by means of cooling coils that encircle the outside barrel of the burner along its length. The downstream end of the burner may be provided with a cored face plate through which a coolant is circulated. For example, an annular cooling chamber may encircle the annular exit orifice and/or the central conduit exit orifice. The cooling chamber, central conduit exit orifice and/or the annular exit orifice may constitute a single piece of thermal and wear resistant material such as tungsten carbide or silicon carbide. Any suitable coolant may be employed e.g. water.

In one embodiment of the subject burner, a pluraity of high pressure high velocity jet streams of a gaseous material is passed into the central conduit and/or annular passage at various locations along their length. By this means atomizing of the fuel feedstream and, optionally, mixing it with the oxidant stream may be facilitated. For example, the gaseous material may be passed through a plurality of small diameter passages or holes i.e. about 0.032 to 0.50 diameter that lead into said central conduit and/or annular passage.

The gaseous material may be selected from the group consisting of steam, free-oxygen containing gas, $CO_2$, $N_2$, fuel gas, a recycle portion of the product gas, and mixtures thereof. The gaseous material may be introduced into the burner at a temperature in the range of about ambient to 1500° F. and a velocity in the range of about 100 feet per second to sonic velocity. The pressure of the gaseous material may be in the range of about 76 to 4500 psia and is greater than the pressure of the other feedstreams passing through the burner.

The discharge velocity for the material leaving through the central exit orifice is in the range of about 0.5 to 1.5 times, and preferably the same as, the discharge velocity of the material leaving through the annular exit orifice. The streams leaving the two exit orifices mix together and atomization may take place immediately downstream from the face of the burner.

In another embodiment of the invention, additional mixing of the reactant streams is effected in at least one, say 2 to 5 coaxial cylindrical shaped pre-mix chambers in series in the central conduit and/or at least one, say 2 to 5 annular shaped pre-mix chambers in series in the annular passage. In such case, the downstream ends of the central bunch of helical or parallel tubes are retracted upstream from the face of the burner a distance of 0 to 12, such as about 2 or more, say about 3 to 10 times the minimum diameter of the circular exit orifice and/or the downstream ends of the annular bunch of helical or parallel tubes are retracted upstream from the face of the burner a distance of 0 to 12, such as about 2 or more, say about 3 to 10 times the minimum width of the annular exit orifice. Preferably, the downstream ends of the central and annular bunches of helical or parallel tubes are retracted upstream from the entrance to the first pre-mix chamber in the line. For example, the set back of the ends of the tubes from the entrance to the first pre-mix chamber may be in the range of about 0.1–2.0 times the diameter of the first pre-mix chamber.

In one embodiment, each of the pre-mix chambers in the central conduit except the first are cylindrical shaped and comprises a coaxial cylindrical body portion followed by a coaxial at least partially converging outlet portion. The first cylindrical-shaped pre-mix chamber in the central conduit comprises a normal coaxial cylindrical body portion that discharges directly into the next in line coaxial cylindrical shaped pre-mix chamber. Each pre-mix chamber in the annular conduit except the first is annular shaped and comprises a coaxial generated normal cylindrical annular body portion followed by a coaxial generated converging frusto-conical shaped annular outlet portion. The first annular shaped pre-mix chamber comprises a coaxial generated normal cylindrical annular body portion that discharges directly into the next in line coaxial annular shaped pre-mix chamber. The converging outlet portions of said pre-mix chambers may be made from tungsten carbide or silicon carbide for increased wear resistance.

The size relationship between successive pre-mix chambers in the subject burners may be expressed in the following manner: For burners in which the pre-mix chambers in the central conduit are successively numbered 1 to 5 and/or the pre-mix chambers in the annular passage are numbered 6–10, then the ratio of the diameter of any one of said central chambers to the diameter of the next central chamber in the line i.e. $D_1:D_2$; $D_2:D_3$; $D_3:D_4$; or $D_4:D_5$ may be in the range of about 0.2–1.2. The ratio of the length of any one central premix chamber in said central conduit to the length of the next central pre-mix chamber in the line i.e. $L_1:L_2$; $L_2:L_3$; $L_3:L_4$; or $L_4:L_5$ may be in the range of about 0.1–1.0. The ratio of the annular width of any one of said annular pre-mix chambers to the width of the next annular chamber in the line i.e. $W_6:W_7$; $W_7:W_8$; $W_8:W_9$; or $W_9:W_{10}$ may be in the range of about 0.1–1.2. The ratio of the length of any one annular pre-mix chamber in said annular passage to the length of the next annular pre-mix chamber in the line, i.e. $L_6:L_7$; $L_7:L_8$; $L_8:L_9$; or $L_9:L_{10}$ may be in the range of about 0.1–1.0.

In most other respects the design of this pre-mix embodiment of the burner, including the tubes, passages, orifices, water-cooled face-plate and cooling coils, high pressure high velocity jets of a gaseous material entering said central and/or annular pre-mix chambers, and flow control means are substantially the same as previously described. Further, the temperature, pressure and velocity ranges for the streams of materials passing through the various passages of the burner are substantially the same as those discussed previously.

In the operation of the embodiment of the burner employing pre-mix chambers flow control means may be used to control the flow of the four feedstreams to the tubes and passages in the burner in the same manner as described previously. The feedstreams entering the burner and simultaneously and concurrently passing through at different velocities impinge and mix with each other in the first pre-mix chambers. The impingement of one reactant stream, such as the liquid slurry of solid carbonaceous fuel in a liquid medium optionally in admixture with a temperature moderator, with another reactant stream, such as a gaseous stream of free-oxygen containing gas optionally in admixture with a temperature moderator at a higher velocity, causes the liquid slurry to break up into a fine spray. The multiphase mixture produced then successively passes through any remaining pre-mix chambers where additional mixing takes place. As the mixture passes freely through the subject unobstructed burner its velocity changes many times. For example, at various points in the burner the velocity of the mixture may range from about 20 to 600 ft. per sec. As the mixture flows from one pre-mix chamber to the next, the velocity changes are mainly the result of changes in the diameter of the flow path and the quantity and temperature of the mixture. This promotes a thorough mixing of the components. By operating in the region of turbulent flow, mixing may be maximized. Further, direct heat exchange between the materials takes place within the burner. From 0–100 vol. %, say about 5–25 vol. % of the liquids in the feedstreams may be vaporized before the feedstreams leave the burner. By means of converging exit orifices, the feedstreams may be accelerated directly into the reaction zone of the partial oxidation gasifier.

Burning of the combustible materials while passing through the pre-mix zone of the burner may be prevented by discharging the multiphase mixtures at the central and annular exit orifices at the tip of the burner with a discharge velocity which is greater than the flame propagation velocity. Flame speeds are a function of such factors as composition of the mixture, temperature and pressure. They may be calculated by conventional methods or determined experimentally. The ratio of the discharge velocity for the multiphase mixture being discharged through the central exit orifice to the multiphase mixture being discharged through the annular exit orifice may be in the range of about 0.5 to 1.5, such as 1.0.

Depending on such factors as the temperature, velocity, dwell time and composition of the feedstreams; the desired amount of vaporization of liquid carrier; the temperature and amount of recycle gases in the generator; and the desired life of the burner; cooling coils may or may not encircle the outside barrel of the burner along its length. For similar reasons, the burner may or may not be provided with an annular shaped cooling chamber at the downstream end.

The multiphase mixtures simultaneously departing from the central orifice and/or the annular orifice at the downstream tip of the burner mix together downstream from the face of the burner.

Advantageously, by means of the subject burner, the exothermic partial oxidation reactions take place a sufficient distance downstream from the burner face so as to protect the burner from thermal damage.

Liquid hydrocarbon fuels and/or pumpable slurries of solid carbonaceous fuels having a dry solids content in the range of about 30 to 75 wt. %, say about 40 to 70 wt. % may be passed through the inlet passages of the subject burner. For example, the fuel streams may be passed through the central and/or annular bunch of tubes. The inlet temperature of the liquid hydrocarbon fuel or the slurry is in the range of about ambient to 500° F., but preferably below the vaporization temperature of the liquid hydrocarbon at the given inlet pressure in the range of about 1 to 300 atmospheres, such as 5 to 250 atmospheres, say about 10 to 100 atmospheres.

The term solid carbonaceous fuels, as used herein to describe suitable solid carbonaceous feedstocks, is intended to include various materials and mixtures thereof from the group consisting of coal, coke from coal, char from coal, coal liquefaction residues, petroleum coke, particulate carbon soot, and solids derived from oil shale, tar sands, and pitch. All types of coal may be used including anthracite, bituminous, sub-bituminous, and lignite. The particulate carbon may be that which is obtained as a by-product of the subject partial oxidation process, or that which is obtained by burning fossil fuels. The term solid carbonaceous fuel also includes by definition bits of garbage, dewatered sanitary sewage sludge, and semi-solid organic material such as asphalt, rubber and rubber-like materials including rubber automobile tires which may be ground or pulverized to the proper particle size. Any suitable grinding system may be used to convert the solid carbonaceous fuels or mixtures thereof to the proper size.

The solid carbonaceous fuels are preferably ground to a particle size so that 100% of the material passes through an ASTM E 11-70 Sieve Designation Standard 1.4 mm (Alternative No. 14) and at least 80% passes through an ASTM E 11-70 Sieve Designation Standard 425 $\mu$m (Alternative No. 40).

The moisture content of the solid carbonaceous fuel particles is in the range of about 0 to 40 wt. %, such as 2 to 20 wt. %.

The term liquid carrier, as used herein as the suspending medium to produce pumpable slurries of solid carbonaceous fuels is intended to include various materials from the group consisting of water, liquid hydrocarbonaceous material, and mixtures thereof. However, water is the preferred carrier for the particles of solid carbonaceous fuel. In one embodiment, the liquid carrier is liquid carbon dioxide. In such case, the liquid slurry may comprise 40–70 wt. % of solid carbonaceous fuel and the remainder is liquid $CO_2$. The $CO_2$-solid fuel slurry may be introduced into the burner at a temperature in the range of about $-67°$ F. to $100°$ F. depending on the pressure.

The term liquid hydrocarbonaceous material as used herein to describe suitable liquid carriers and fuels is intended to include various liquid hydrocarbon materials, such as those selected from the group consisting of liquefied petroleum gas, petroleum distillates and residues, gasoline, naphtha, kerosine, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operation, furfural extract of coker gas oil and mixtures thereof.

The term liquid hydrocarbonaceous material as used herein to describe suitable liquid fuels is also intended to include various oxygen containing liquid hydrocarbonaceous organic materials, such as those selected from the group consisting of carbohydrates, cellulosic materials, aldehydes, organic acids, alcohols, ketones, oxygenated fuel oil, waste liquids and by-products from chemical processes for producing oxygenated hydrocarbonaceous organic materials, and mixtures thereof.

For example in one embodiment, the feedstream comprises a slurry of liquid hydrocarbonaceous material and solid carbonaceous fuel. $H_2O$ in liquid phase may be mixed with the liquid hydrocarbonaceous carrier, for example as an emulsion. A portion of the $H_2O$ i.e., about 0 to 25 weight % of the total amount of $H_2O$ present may be introduced as steam in admixture with the free-oxygen containing gas. The weight ratio of $H_2O$/fuel may be in the range of about 0 to 5, say about 0.1 to 3.

The term gaseous hydrocarbonaceous material as used herein to describe suitable gaseous hydrocarbonaceous fuels is intended to include a gaseous feedstock from the group consisting of ethane, propane, butane, pentane, methane, natural gas, coke-oven gas, refinery gas, acetylene tail gas, ethylene off-gas, and mixtures thereof.

Simultaneously with the fuel stream(s), one or more free-oxygen containing gas stream(s) is supplied by way of a free passage(s) in the burner. The free-oxygen containing gas may be passed through the central and/or annular sections at a temperature in the range of about ambient to $1500°$ F., and preferably in the range of about ambient to $300°$ F., for oxygen-enriched air, and about $500°$ to $1200°$ F., for air, and a pressure in the range of above about 1 to 300 atmospheres, such as about 5 to 250 atmospheres, say about 10 to 100 atmospheres. The atoms of free-oxygen plus atoms of organically combined oxygen in the solid carbonaceous fuel per atom of carbon in the solid carbonaceous fuel (O/C atomic ratio) may be in the range of 0.5 to 1.95. With free-oxygen containing gas in the reaction zone the broad range of said O/C atomic ratio may be about 0.5 to 1.7, such as about 0.7 to 1.4. More specifically, with air feed to the reaction zone, said O/C atomic ratio may be about 0.7 to 1.6, such as about 0.9 to 1.4.

The term free-oxygen containing gas, as used herein is intended to include air, oxygen-enriched air, i.e., greater than 21 mole % oxygen, and substantially pure oxygen, i.e., greater than 95 mole % oxygen, (the remainder comprising $N_2$ and rare gases).

The free-oxygen containing gas may be supplied with or without mixture with a temperature moderating gas. The term temperature moderating gas as employed herein is intended to include by definition a member of the group consisting of steam, $CO_2$, $N_2$, a recycle portion of the cooled and cleaned effluent gas stream from the gas generator, and mixtures thereof.

Figure 1:
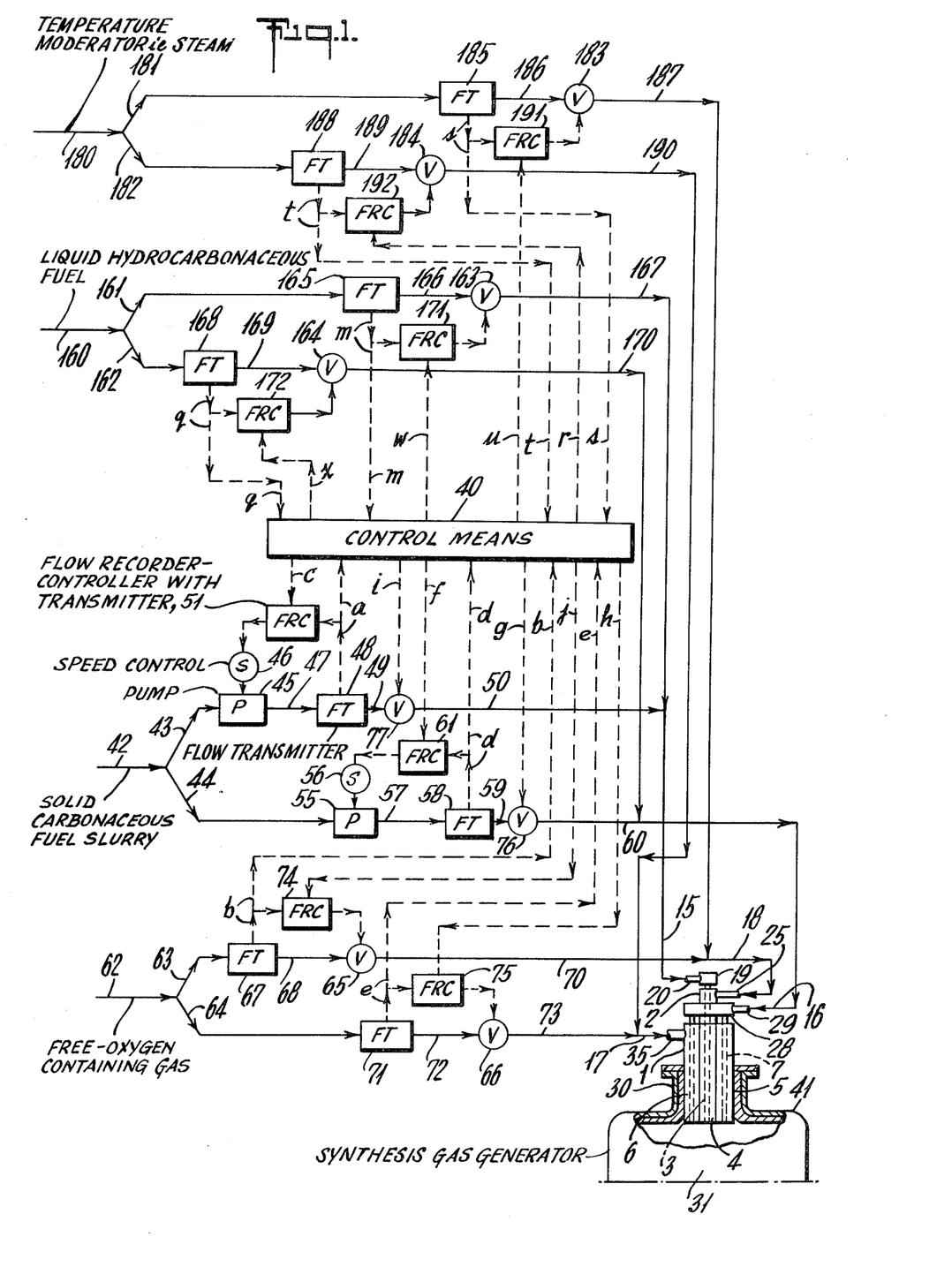
FIG. 1 is a schematic representation of one embodiment of the invention showing control means for replacing one fuel with another while maintaining continuous operation; and for rapidly changing throughput levels—up or down.
Figure 2:
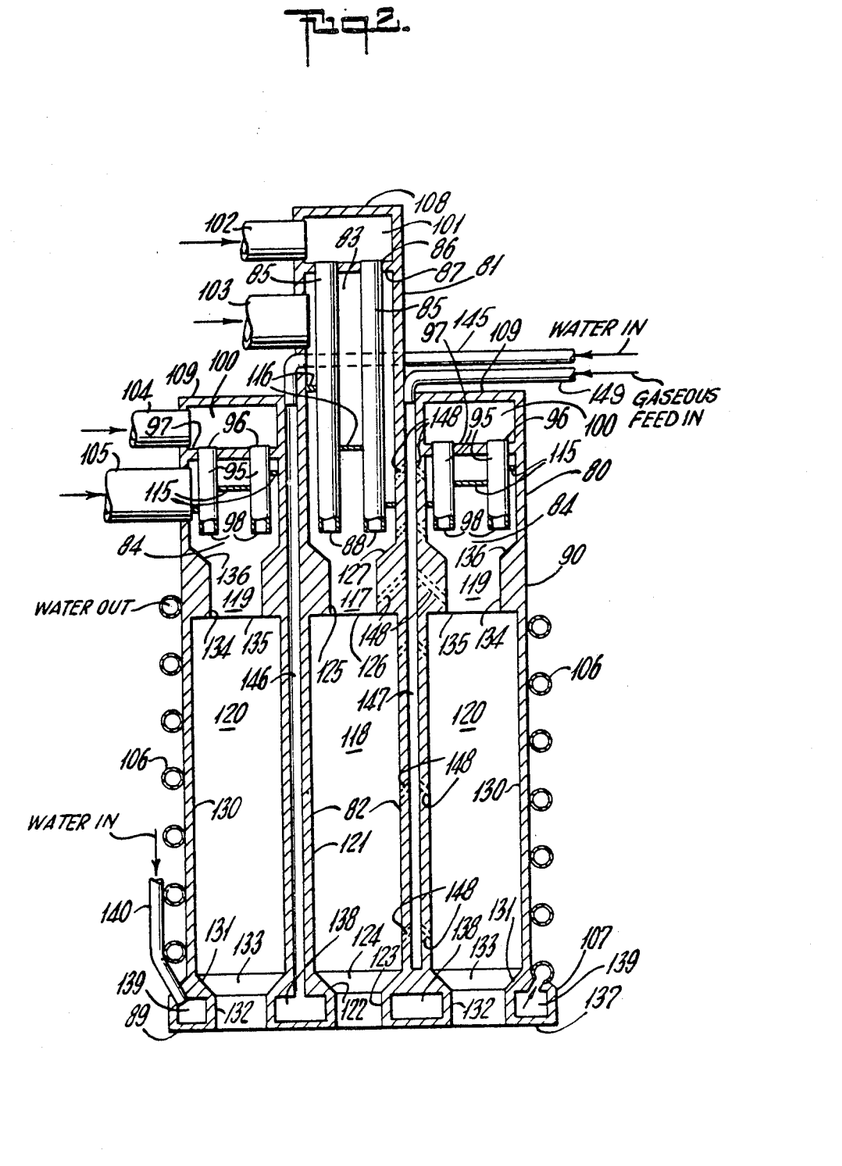
FIG. 2 is a vertical longitudinal schematic representation of one embodiment of a two-compartment burner suitable for use in the subject process.

The subject burners as shown in FIGS. 1-2 may be operated with the feedstreams passing through alternative passages in the burner. Typical modes of operation before or after replacement of fuels are summarized in Tables I and II below.

Table I lists the materials being introduced into the gasifier by way of the burner and their corresponding symbol. The solid carbonaceous fuel (B), water (C), and liquid hydrocarbonaceous material (E) may be mixed together in various combinations upstream from the burner inlet to produce a pumpable slurry which may be introduced into the burner and then passed through one of the several free-flow passages of the burner as shown in Table II. For example, the first entry in Table II shows that a pumpable slurry stream comprising solid carbonaceous fuel (B) in admixture with water (C) may be passed through the central and/or annular bunch of tubes in the burner i.e. FIG. 1 or 2. Whenever a fuel stream is introduced into the burner by way of the central and/or bundles of tubes, a corresponding stream of free-oxygen containing gas is simultaneously passed through the related central conduit and/or annular passage. Some additional examples follow:

(1) separate streams of free-oxygen containing gas may be passed through said central and/or annular bunches of tubes; and simultaneously separate corresponding streams of a pumpable slurry of solid carbonaceous fuel in a liquid carrier or a hydrocarbonaceous fuel may be passed through the related central conduit and/or annular passage.

(2) separate streams of free-oxygen containing gas may be passed through said central conduit and said annular passage; while simultaneously a corresponding stream of liquid hydrocarbonaceous material is passed through the related central and/or annular bunches of tubes; and simultaneously a pumpable slurry of solid carbonaceous fuel in a liquid carrier may be passed through the unoccupied bunch of said tubes, if any.

(3) separate streams of free-oxygen containing gas may be passed through said central and/or annular bunches of tubes; while simultaneously a corresponding stream of liquid hydrocarbonaceous material is passed through the related central and/or annular passage; and simultaneously a pumpable slurry of solid carbonaceous fuel in a liquid carrier may be passed through the unoccupied passage, if any.

TABLE I

| Material | Symbol |
|---|---|
| Free-oxygen Containing Gas | A |
| Solid Carbonaceous Fuel | B |
| Water | C |
| Steam | D |
| Liquid Hydrocarbonaceous Material | E |
| Temperature Moderating Gas | F |
| Gaseous Hydrocarbon Fuel | G |

TABLE II

| Central Conduit | Central Bunch of Tubes | Annular Passage | Annular Bunch of Tubes |
|---|---|---|---|
| A | B + C | A | B + C |
| A + D | B + C | A + D | B + C |
| B + C | A | B + C | A |
| A | B + C | B + C | A |
| B + C | A | A | B + C |
| A | B + C + E | A | B + C + E |

TABLE II-continued

| Central Conduit | Central Bunch of Tubes | Annular Passage | Annular Bunch of Tubes |
|---|---|---|---|
| B + C + E | A + D | B + C + E | A + D |
| A | E | A | E |
| A + D | B + E | A + D | B + E |
| B + E | A + D | B + E | A + D |
| A + D | E | A | B + C |
| E | A | E | A |
| B + C | A | E | A |
| E | A | B + C | A |
| A | G | A | B + C |
| A | G | A + D | E |
| A | E + F | A | E + F |
| E + F | A + D | E + F | A + D |

Other modes of operation of the subject invention are possible in addition to those shown in Table II.

For example, jet streams of a gaseous material may be simultaneously introduced into the central conduit and/or annular passage, as previously described.

When one of the fuel streams is a liquid hydrocarbon or the liquid carrier for the slurry of solid carbonaceous fuel is a liquid hydrocarbonaceous material premature combustion within the burner may be avoided by one or more of the following:
(1) keeping the fuel below its autoignition temperature,
(2) including water in the solid fuel slurry,
(3) using air or air enriched with oxygen i.e. up to about 40 vol. % $O_2$,
(4) mixing steam with the air,
(5) employing about 0 retraction of the ends of the central and annular bunches of tubes from the face of the burner. In such case, the free-oxygen containing gas such as substantially pure oxygen may be separately discharged from the burner without first contacting the fuel stream.
(6) discharging the multiphase mixture at the central and annular exit orifices at the tip of the burner with discharge velocities that exceed the flame propagation velocity.

The subject burner assembly is inserted downward through a top inlet port of a compact unpacked free-flow noncatalytic refractory lined synthesis gas generator, for example as shown in coassigned U.S. Pat. No. 3,544,291. The burner extends along the central longitudinal axis of the gas generator with the downstream end discharging directly into the reaction zone.

The relative proportions of the reactant feedstreams and optionally temperature moderator that are introduced into the gas generator are carefully regulated to convert a substantial portion of the carbon in the fuel e.g., up to about 90% or more by weight, to carbon oxides; and to maintain an autogenous reaction zone temperature in the range of about 1700° to 3500° F., preferably in the range of 2000° to 2800° F.

The dwell time in the reaction zone is in the range of about 1 to 10 seconds, and preferably in the range of about 2 to 8. With substantially pure oxygen feed to the gas generator, the composition of the effluent gas from the gas generator in mole % dry basis may be as follows: $H_2$ 10 to 60, CO 20 to 60, $CO_2$ 5 to 40, $CH_4$ 0.01 to 5, $H_2S + COS$ nil to 5, $N_2$ nil to 5, and $A_r$ nil to 1.5. With air feed to the gas generator, the composition of the generator effluent gas in mole % dry basis may be about as follows: $H_2$ 2 to 30, CO 5 to 35, $CO_2$ 5 to 25, $CH_4$ nil to 2, $H_2S + COS$ nil to 3, $N_2$ 45 to 80, and $A_r$ 0.5 to 1.5. Unconverted carbon and ash are contained in the effluent gas stream.

The hot gaseous effluent stream from the reaction zone of the synthesis gas generator is quickly cooled below the reaction temperature to a temperature in the range of about 250° to 700° F. by direct quenching in water, or by indirect heat exchange for example with water to produce steam in a gas cooler.

Advantageously, in another embodiment of the subject invention the subject two-section burner may be used as the preheat burner during start-up of the gasifier, as well as the production burner. Start-up procedures are thereby simplified. Previously, time was lost when the gas preheat burner was replaced by the production burner, and the gasifier cooled down. Now the gasifier may be brought up to operating temperature and held there by simultaneously passing a gaseous or liquid hydrocarbonaceous fuel i.e. fuel gas, with or without mixture with $H_2O$, through the central and/or annular bundle(s) of tubes and a free-oxygen containing gas, preferably air, with or without mixture with $H_2O$ through the associated central conduit and/or annular passage. Alternately, the gaseous or liquid hydrocarbonaceous fuel i.e. fuel gas with or without mixture with $H_2O$ may be passed through the central conduit and/or annular passage in the burner and the air with or without mixture with $H_2O$ may be passed through the associated central and/or annular bundle(s) of tubes. The fuel gas and air are mixed together to produce a well-distributed blend. Burning of the mixture by substantially complete combustion then takes place in the reaction zone of the gas generator at a temperature in the range of about 2000° to 4500° F., such as about 2000° to 3000° F. and at an absolute pressure in the range of about 0.56 to 300 atmospheres, and preferably at 1 atmosphere. The products of the complete combustion are removed from the reaction zone. For example, they may be vented to the atmosphere.

By this means, the reaction zone is heated to the temperature required for ignition of the autothermal partial oxidation reaction of the principal fuel selected from the group consisting of a pumpable slurry of solid carbonaceous fuel, liquid or gaseous hydrocarbon fuel, and mixtures thereof with a free-oxygen containing gas and with or without a temperature moderator. For example, the autoignition temperature may be in the range of about 2000° to 2700° F. At this point, the fuel gas, with or without mixture $H_2O$, is phased out of the tubes or conduits in which it is flowing in the central and/or annular section (s) of said two-section burner with a uniformly decreasing rate of flow that varies from maximum rate to 0 over a period in the range of about 1-3600 seconds, say about 60-1800 seconds. Simultaneously, the principal solid carbonaceous fuel slurry or liquid hydrocarbonaceous fuel, with or without mixture with $H_2O$, is phased into the remaining portion of said fuel gas and replaces the phased-out portion of the fuel gas with a uniformly increasing rate of flow that varies from 0 to maximum over the same period of time.

Simultaneously with the replacement of the fuel, or alternatively when the fuel gas has been completely replaced in the burner by the principal fuel, the free-oxygen containing gas i.e. air, with or without mixture with $H_2O$, is phased out with a uniformly decreasing rate of flow that varies from maximum to 0 over a period in the range of 1-3600 seconds, say about 60-1800 seconds. Simultaneously, another free-oxygen containing gas i.e. oxygen-rich gas or substantially pure oxygen for the production of syngas is phased into the same line to replace the air at a uniformly increasing rate of flow that varies from 0 to maximum over the same period of time. Further, the rates of flow of the free-oxygen containing gas with or without mixture with $H_2O$ and if necessary the weight ratio $H_2O$/fuel in the reaction zone are adjusted so as to continuously maintain the temperature and the weight ratio $H_2O$/fuel in the reaction zone at design conditions for the partial oxidation of said principal fuel.

Partial oxidation of the principal fuel takes place downstream in the reaction zone of the free-flow non-catalytic gas generator at design conditions which include an autogenous temperature in the range of about 1700° to 3500° F., a pressure in the range of about 1 to 300 atmospheres, an atomic ratio of oxygen to carbon in the range of about 0.5 to 1.7, say 0.8 to 1.2, and an $H_2O$/fuel weight ratio in the range of about 0 to 5.0, such as 0.1 to 3.

The hot gaseous effluent stream from the reaction zone of the synthesis gas generator is quickly cooled below the reaction temperature to a temperature in the range of about 250° to 700° F. by direct quenching in water, or by indirect heat exchange for example with water to produce steam in a gas cooler. The gas stream may be cleaned and purified by conventional methods.

DESCRIPTION OF THE DRAWING

A more complete understanding of the invention may be had by reference to the accompanying schematic drawing which shows the subject invention in detail. Although the drawing illustrates preferred embodiments of the invention, it is not intended to limit the subject invention to the particular apparatus or materials described.

Referring to the figures in the drawing, FIG. 1 is a schematic representation of one embodiment of the invention showing control means for the continuous operation of a synthesis gas generator while phasing out one fuel and simultaneously phasing in another without depressurizing. Further, the control means may be used for rapidly changing throughput levels—up or down over the flow range for which the two-section burner shown is designed. By this means adjustments may be made to control the amount of raw effluent gas produced, and to provide for a change in demand for the product gas. Further, another use for the control system is to maintain the desired composition of the product gas when possible to do so by adjustments to the flow rates of one or more of the reactant streams. Thus, by the subject flow control system, the flow rates for all of the reactant streams are separately and independently controlled so that the temperature and weight ratio of $H_2O$ to fuel in the reaction zone are maintained at design conditions and within desired operating ranges for the fuel being reacted. If necessary the atomic ratio of free-oxygen to carbon in the fuel in the reaction zone may also be controlled within design conditions.

While the control system shown in FIG. 1 is specifically designed for the combination of feedstocks comprising a solid carbonaceous fuel slurry and a liquid hydrocarbonaceous fuel, by simple modifications to the means for changing the flow rate of the streams up or down in a manner similar to that as described below, the system may be used to control other combinations of solid carbonaceous fuel slurries, and liquid, or gaseous hydrocarbon fuels.

Two-section burner 1 is mounted in central flanged inlet 30 located in the upper head of conventional refractory lined free-flow synthesis gas generator 41 along the central longitudinal axis. The reactant streams enter through the upstream end of burner 1, pass downward therethrough, and are discharged through the downstream end. Burner 1 is designed so that the required system output for steady-state operation may be achieved or even exceeded by a specified amount when the flow rate through all passages in both sections of the two-section burner is a maximum. The control system can independently change up or down the flow rate of any one or more of the reactant streams in lines 187, 190, 167, 170, 50, 60, 70 and 73. By this means the temperature in the reaction zone 31 is maintained at the desired operating temperature. Further, the weight ratio $H_2O$ to fuel, and if necessary the atomic ratio of free oxygen to carbon in the fuel in the reaction zone may be maintained at design conditions whether one or both sections of the burner are employed to step-up or step-down production of product gas.

Two-section burner 1 comprises a central section and a concentric annular section. The central section substantially comprises: central cylindrical conduit 2 having a closed upstream end and an open downstream end, central bunch of parallel tubes 3 supported longitudinally in central passage 4 of central conduit 2 and having open upstream ends that pass through and are sealed in the closed upstream end of central conduit 2 and are in communication with central cylindrical shaped manifold 19, inlet feed pipe 20 connected to and in communication with central manifold 19, and inlet feed pipe 25 connected to and in communication with the closed upstream end of central conduit 2. The annular section comprises; outer cylindrical concentric conduit 5 which is closed at the upstream end and open at the downstream end, annular passage 6 between the outside diameter of central conduit 2 and the inside diameter of outer conduit 5 along its length, annular bunch of parallel tubes 7 supported longitudinally in said annular passage 6 and having open upstream ends that pass through and are sealed in the closed upstream annular end of outer conduit 5 and are in communication with annular manifold 28, inlet feed pipe 29 connected to and in communication with annular manifold 28, and inlet feed pipe 35 connected to and in communication with the upstream closed end of outer conduit 5.

While the downstream tips of central bunch of tubes 3 and annular bunch of tubes 7 are shown in FIG. 1 as being flush with the face of burner 1, in other embodiments of the two-section burner the downstream tips of the central and/or annular bunch(es) of tubes may be retracted upstream to provide at least one premix zone as shown in FIG. 2.

Although central bunch of tubes 3 and annular bunch of tubes 7 are shown in FIG. 1 as being parallel to each other and to the burner axis, in another embodiment of the two-compartment burner which is shown and described in coassigned U.S. patent application Ser. No. 212,054 i.e. FIG. 5, of which the subject application is a continuation-in-part, the central and/or annular bunches of tubes may be helical-shaped. By this means the swirling reactant streams passing down through the central and/or annular bundles of helical tubes; and separately down through the helical passages on the outside of the helical bundles of tubes may impinge together either in the premix zones or downstream in the reaction zone and may be thereby intimately mixed together. Combustion efficiency of the burner is thereby improved.

In FIG. 1 for purposes of illustration, the principal fuel may be for example a solid carbonaceous fuel slurry i.e. coal-water slurry in line 42. The stand-by fuel is a liquid hydrocarbonaceous fuel i.e. residual oil in line 160. Of course, the principal fuel may have been chosen to be any liquid or gaseous hydrocarbonaceous fuel or a coal-oil slurry. The metered feedstream of solid carbonaceous fuel slurry in line 42 is split into two fuel feedstreams 43 and 44 by separate flow control means in each line. Similarly, the metered feedstream of liquid hydrocarbonaceous fuel in line 160 is split into two fuel feedstreams 161 and 162 by separate flow control means in each line. In the subject process, the remaining portions of the principal fuel stream(s) being phased out of line 50 and/or line 60 are respectively mixed in lines 15 and/or 16 with the stand-by fuel stream(s) being phased into line 167 and/or line 170.

In a similar manner, the metered feedstream of free-oxygen containing gas in line 62 is split into two feedstreams 63 and 64 by separate flow control means in each line.

$H_2O$ may be in admixture with the fuels in lines 160 and 42 or the free-oxygen containing gas in line 62. Alternatively, as shown in FIG. 1, at least a portion i.e. 10–100 vol. % of the $H_2O$ may be provided as steam. Thus, steam in line 180 is split into two feedstreams 181 and 182 by separate flow control means in each line. By this means as shown in FIG. 1, steam in line(s) 187 and/or 190 preferably may be mixed respectively in line(s) 18 and/or 17 with the free-oxygen containing gas flowing into one or both sections of the burner. In a similar manner (not shown) steam from line(s) 187 and/or 190 may be respectively supplied to the fuel in line(s) 15 and/or 16. By this scheme, controlled amounts of steam may be introduced into and mixed with the stream(s) of free-oxygen containing gas and/or fuel upstream from the burner.

The weight or volumetric rate of flow for that portion of the feed flowing through each of the feedlines to the burner is a function of the burner design. For example, the burner passages may be sized so that one-third of the total quantity of the solid carbonaceous fuel slurry flowing through line 42 plus the liquid hydrocarbonaceous fuel flowing through line 160 may be discharged through central bunch of tubes 3 at a specified velocity range. Simultaneously, the remaining two-thirds of the total quantity of solid carbonaceous fuel slurry plus liquid hydrocarbonaceous fuel may be discharged through annular bunch of tubes 7 at a specified velocity range.

Valves 183, 184, 163, 164, 77, 76, 65 and 66 may be manually or automatically operated to obtain a wide open position to a completely closed position. The rates that each valve may be opened and closed is also controllable. In one embodiment to be further described, by closing specific valves one may turndown or sectionalize the burner. The burner may be thereby operated either in the central section i.e. central tubes 3 and annular passage 4, or in the outer annular section i.e. annular tubes 7 and annular passage 6, or with both the central and annular sections of the burner in simultaneous operation.

Operation of the system while employing only the central section of the burner will be described first. The portion of the slurry feedstream in line 43 is pumped into the reaction zone 31 of synthesis gas generator 41 by way of positive displacement pump 45 equipped with speed control 46, line 47, flow measurer and transmitter 48, line 49, valve 77, lines 50 and 15, inlet 20 of burner 1, central manifold 19, and central bunch of tubes 3.

The slurry flow rate through line 43 is controlled by the speed of positive displacement pump 45. In order to phase out the slurry flowing through line 43, this speed is continuously decreased from maximum to zero over a period in the range of about 1 to 3600 seconds, such as about 60 to 1800 seconds, say about 300 to 1000 seconds. Flow recorder-controller with transmitter 51 comprises a microcomputer means which is programmed with the desired time vs. decreasing flow rate curve. The rate of slurry flow in line 47 is measured and a signal a is provided by flow transmitter 48 corresponding to the flow rate of the slurry in line 43. Flow recorder-controller 51 receives signal a, compares it with a signal representing the desired flow rate for that moment, and provides a corresponding adjustment signal to speed control 46 to adjust the speed of pump 45 downward so that the charge slurry flowing in line 49 assumes a given decreased flow rate for that moment in the phase-out period. The new slurry rate is measured and the cycle is repeated. By this means, repeated adjustments to the rate of flow are made and the slurry flowing in line 50 is phased out.

Simultaneously with the phasing out of the portion of principal slurry fuel flowing in line 43, the portion of stand-by liquid hydrocarbonaceous fuel flowing in line 161 is phased in over the same period of time. Flow recorder-controller with transmitter 171 comprises a microcomputer means which is programmed with the desired time vs. increasing flow rate curve. The rate of oil flow in line 161 is measured and a signal m is provided by flow transmitter 165 corresponding to the flow rate of the oil in line 161. Flow recorder-controller 171 receives signal m, compares it with a signal representing the desired flow rate for that moment and provides a corresponding adjustment signal to valve 163 to open wider so that the charge oil in line 166 assumes a given increased flow rate for that moment in the phase-in period. The new oil rate is measured and the cycle is repeated. By this means, repeated adjustments to the rates of flow of the principal and stand-by fuels may be made so that the oil flowing in line 167 may be phased into line 15 in an amount that compensates for the reduced amount of solid carbonaceous fuel slurry flowing in line 50.

During or after the period that the portion of principal solid carbonaceous slurry fuel from line 43 is phased out and the portion of stand-by liquid hydrocarbon fuel from line 161 is phased in, the weight ratio of temperature moderator to fuel in the reaction zone may be controlled for example at design conditions, or substantially constant i.e. less than ±10% variation, by increasing or decreasing the flow rate of the temperature moderator. Accordingly in the subject example, simultaneously with the phase-out of the coal-water slurry a supplemental amount of $H_2O$ from an external source may be phased in over the same period of time. Thus, in FIG. 1, a portion of the steam in line 180 is passed through line 181 and is phased into line 18 where it mixes with the free-oxygen containing gas from line 70. Flow recorder-controller with transmitter 191 comprises a microcomputer which is programmed with the desired time vs. increasing flow rate curve.

The rate of steam flow in line 181 is measured and a signal s is provided by flow transmitter 185 corresponding to the flow rate of the steam in line 181. Flow recorder-controller 191 receives signal s, compares it with a signal representing the desired flow rate for that moment and provides a corresponding adjustment signal to valve 183 to open wider so that the charge steam in line 186 assumes a given increased flow rate for that moment in the phase-in period. The new steam rate is measured and the cycle is repeated. By this means, repeated adjustments to the rate of steam flow are made and the steam flowing in line 187 is phased into line 18 in an amount that will maintain the weight ratio of $H_2O$ to fuel in the reaction zone at design conditions.

In another embodiment the weight ratio $H_2O$/fuel in the reaction zone is adjusted up or down by controlling the steam rate as described previously in order to obtain a desired temperature in the reaction zone and composition of the product gas.

Simultaneously with or after the phasing out of the principal fuel, the phasing in of the stand-by fuel, and optionally with or without the phasing in or out of the steam depending on the nature of the fuels, the free-oxygen containing gas may be adjusted up or down so as to control the temperature in the reaction zone for example at design conditions, or substantially constant i.e. less than $\pm 200°$ F. variation. Thus, in the present example in FIG. 1, a portion of the free-oxygen containing gas in line 62 is passed through line 63 and is phased into line 18 where it mixes with the steam, if any, from line 187 as previously described. Flow controller 74 is programmed with the desired time vs. flow rate curve. The period of adjustment is the same as that for the fuel and steam streams. The adjustment to the oxygen flow rate may be up or down depending on the nature of the fuel streams and the addition of steam, if any. In the subject example, the oxygen flow rate will be increased to satisfy the additional requirements for the partial oxidation of a liquid hydrocarbon in comparison with a solid carbonaceous fuel.

The rate of free-oxygen containing gas in line 63 is measured and a signal b is provided by flow transmitter 67 corresponding to the flow rate of the free-oxygen containing gas in line 63. Flow recorder-controller with transmitter 74 comprises a microcomputer means which receives signal b, compares it with a signal representing the desired flow rate for that moment, and provides a corresponding adjustment signal to valve 65 to open wider so that the charge free-oxygen containing gas in line 68 assumes a given increased flow rate for that moment in the phase-in period. The new free-oxygen containing gas rate is measured and the cycle is repeated. By this means repeated adjustments to the rate of oxygen flow are made and the free-oxygen containing gas flowing in line 70 is phased into line 18 in an amount that will maintain the temperature in the reaction zone substantially constant.

In another embodiment, the free-oxygen containing gas rate is adjusted up or down to obtain a desired temperature in the reaction zone and composition of the product gas. Alternatively, by the previously described means, the atomic ratio of oxygen to carbon in the reaction zone may be controlled at design conditions i.e. in the range of about 0.5 to 1.7.

Operation of the system while employing only the annular section of the burner is similar to that described previously in connection with the central section of the burner. The portion of the slurry feedstream in line 44 is pumped into the reaction zone 31 of synthesis gas generator 41 by way of positive displacement pump 55 equippped with speed control 56, line 57, flow measurer and transmitter 58, line 59, valve 76, lines 60 and 16, inlet 29 of burner 1, annular manifold 28, and annular bunch of tubes 7.

The slurry flow rate through line 44 is controlled by the speed of positive displacement pump 55. In order to phase out the slurry flowing through line 44, this speed is continuously decreased from maximum to zero over a period in the range of about 1 to 3600 seconds, such as about 60 to 1800 seconds, say about 300 to 1000 seconds. Flow recorder-controller with transmitter 61 comprises a microcomputer which is programmed with the desired time vs. decreasing flow rate curve. The rate of slurry flow in line 57 is measured and a signal d is provided by flow transmitter 58 corresponding to the flow rate of the slurry in line 44. Flow recorder-controller 61 receives signal d, compares it with a signal representing the desired speed at that moment, and provides a corresponding adjustment signal to speed control 56 to adjust the speed of pump 55 downward so that the charge slurry flowing in line 59 assumes a given decreased flow rate for that moment in the phase-out period. The new slurry rate is measured and the cycle is repeated. By this means, repeated adjustments to the rate of flow are made and the slurry flowing in line 60 is phased out.

Simultaneously with the phasing out of the portion of principal slurry fuel flowing in line 44, the portion of stand-by liquid hydrocarbonaceous fuel flowing in line 162 is phased in over the same period of time. Flow recorder-controller with transmitter 172 comprises a microcomputer means which is programmed with the desired time vs. increasing flow rate curve. The rate of oil flow in line 162 is measured and a signal q is provided by flow transmitter 168 corresponding to the flow rate of the oil in line 162. Flow recorder-controller 172 receives signal q, compares it with a signal representing the desired flow rate at that moment, and provides a corresponding adjustment signal to valve 164 to open wider so that the charge oil in line 169 assumes a given increased flow rate for that moment in the phase-in period. The new oil rate is measured and the cycle is repeated. By this means, repeated adjustments to the rates of flow of the principal and stand-by fuels may be made so that the oil flowing in line 170 may be phased into line 16 in an amount that compensates for the reduced amount of solid carbonaceous fuel slurry flowing in line 60.

During or after the period that the portion of principal solid carbonaceous slurry fuel from line 44 is phased out and the portion of stand-by liquid hydrocarbon fuel from line 162 is phased in the weight ratio of temperature moderator to fuel in the reaction zone may be controlled for example at design conditions, or substantially constant i.e. less than $\pm 10\%$ variation by increasing or decreasing the flow rate of the temperature moderator. Accordingly, in the subject example, simultaneously with the phase-out of the coal-water slurry a supplemental amount of $H_2O$ from an external source may be phased in over the same period of time. Thus, in FIG. 1, a portion of the steam in line 180 is passed through line 182 and is phased into line 17 where it mixes with the free-oxygen containing gas from line 73. Flow recorder-controller with transmitter 192 comprises a microcomputer means which is programmed with the desired time vs. increasing flow rate curve.

The rate of steam flow in line 182 is measured and a signal t is provided by flow transmitter 188 corresponding to the flow rate of the steam in line 182. Flow recorder-controller 192 receives signal t, compares it with a signal representing the desired flow rate at that moment, and provides a corresponding adjustment signal to valve 184 to open wider so that the charge steam in line 189 assumes a given increased flow rate for that moment in the phase-in period. The new steam rate is measured and the cycle is repeated. By this means, repeated adjustments to the rate of steam flow are made and the steam flowing in line 190 is phased into line 17 in an amount that will maintain the weight ratio of $H_2O$ to fuel in the reaction zone at design conditions.

In another embodiment the weight ration $H_2O$/fuel in the reaction zone is adjusted up or down by controlling the steam rate as described in the manner described previously in order to obtain a desired temperature in the reaction zone and composition of the product gas.

Simultaneously with or after the phasing out of the principal fuel, the phasing in of the stand-by fuel, and optionally with or without the phasing in or out of the steam depending on the nature of the fuels, the free-oxygen containing gas may be adjusted up or down so as to control the temperature in the reaction zone for example at design conditions, or substantially constant i.e. less than $\pm 200°$ F. variation. Thus in the present example, in FIG. 1, a portion of the free-oxygen containing gas in line 62 is passed through line 64 and is phased into line 17 where it mixes with the steam, if any, from line 190 as previously described. Flow recorder-controller with transmitter 75 comprises a microcomputer means which is programmed with the desired time vs. flow rate curve. The period of adjustment is the same as that for the fuel and steam streams. The adjustment to the oxygen flow rate may be up or down depending on the nature of the fuel streams and the addition of steam, if any. In the subject example, the oxygen flow rate will be increased to satisfy the additional requirements for the partial oxidation of a liquid hydrocarbon in comparison with a solid carbonaceous fuel.

The rate of free-oxygen containing gas in line 64 is measured and a signal e is provided by flow transmitter 71 corresponding to the flow rate of the free-oxygen containing gas in line 64. Flow recorder-controller 75 receives signal e, compares it with a signal representing the desired flow-rate for that moment, and provides a corresponding adjustment signal to valve 66 to open wider so that the charge free-oxygen containing gas in line 72 assumes a given increased flow rate for that moment in the phase-in period. The new free-oxygen containing gas rate is measured and the cycle is repeated. By this means repeated adjustments to the rate of oxygen flow are made and the free-oxygen containing gas flowing in line 73 is phased into line 17 in an amount that will maintain the temperature in the reaction zone substantially constant.

In another embodiment, the free-oxygen containing gas rate is adjusted up or down to obtain a desired temperature in the reaction zone and composition of the product gas. Alternatively, by the previously described means, the atomic ratio of oxygen to carbon in the reaction zone may be controlled at design conditions i.e. in the range of about 0.5 to 1.7.

The previously mentioned time vs. flow rate curves for programming flow controllers 191, 192, 171, 172, 51, 61, 74 and 75 may be determined by conventional calculations based on heat and weight balances for the entire system.

In another embodiment, the parameters for said calculations and any others may be measured by conventional detectors and the signals responsive thereto may be fed to an overall control means or computer 40. The input to flow control means 40 may be manual or a signal from a computer, analyzer, or sensor. Control means 40 comprises conventional circuits and components for providing signals i.e. pneumatic or electronic to operate said speed controls and valves.

In control means 40, the computer calculated values or the manually inserted set points for the desired rates of flow at specific moments for the various streams are compared respectively with the signals a, d; s, t; m, q; and b, e. For example, responsive to signal(s) a and/or d, control means 40 may automatically control pump speed control(s) 46 and/or 56 by sending signal(s) c and/or f respectively to flow-recorder-controller(s) 51 and/or 61. Alternatively, signal(s) c and/or f may be fed directly to speed control(s) 46 and/or 56 respectively. Signals i and/or g from control means 40 may be employed to close respectively solid carbonaceous fuel slurry valves 77 and/or 76. In another embodiment, for example flow recorder-controller 51 may receive signal a from flow transmitter 48 and signal c from control means 40 and compute the speed adjustment signal for the operation of speed control 46.

In a similar manner, responsive to signal(s) s and/or t, control means 40 may automatically control steam valve(s) 183 and/or 184 by sending signals(s) u and/or r respectively to flow-recorder-controller(s) 191 and/or 192.

Similarly, responsive to signal(s) m and/or q, control means 40 may automatically control liquid hydrocarbonaceous fuel valve(s) 163 and/or 164 by sending signal(s) w and/or x respectively to flow-recorder-controller(s) 171 and/or 172.

Also, similarly, responsive to signal(s) b and/or e, control means 40 may automatically control free-oxygen containing gas valve(s) 65 and/or 66 by sending signal(s) j and/or h respectively to flow-recorder-controller(s) 74 and/or 75.

FIG. 2 is a vertical longitudinal schematic representation of another embodiment of the subject two-section burner. Two pre-mix chambers in series are located in the central conduit in the central section and also in the annular passage in the annular section. The ends of the central bundle of tubes in the central section and the annular bundle of tubes in the annular section are retracted upstream from the face of the burner. In FIG. 2 burner 80 comprises central conduit 81 which in part constitutes the wall 82 between central passage 83 and coaxial radially spaced annular passage 84, two rows of a central bundle of parallel tubes 85 that pass longitudinally through the upper portion of central passage 83 and having upstream ends 86 that pass through tube sheet 87 making a gastight hermetic seal therewith, and downstream ends 88 which are retracted upstream from face 89 at the downstream end of burner 80, coaxial concentric radially spaced outer conduit 90 surrounding said annular passage 84 along its length, two rows of an annular bundle of parallel tubes 95 that pass longitudinally through annular passage 84 with upstream ends 96 passing through tube sheet 97 and making a gastight seal therewith and having downstream ends 98 retracted upstream from face 89, annular manifold 100 in communication with the upstream ends 96 of said annular bundle of tubes 95, manifold 101 which may by cylindrical-shaped in communication with the upper ends 86 of said central bundle of tubes 85, inlet means 102 for introducing a first feedstream into said central manifold 101, inlet means 103 for introducing a second feedstream into said central passage 83 and in the interstices surrounding said central bundle of tubes 85, inlet means 104 for introducing a third feedstream into said annular manifold 100, inlet means 105 for introducing a fourth feedstream into said annular passage 84 and into the interstices surrounding the annular bundle of tubes 95, cooling coils 106 which encircle the outside diameter of outer conduit 80 along its length, and cored cooling chamber 107 at the downstream tip of the burner.

Disc shaped central tube sheet 87 closes off central passage 83 below its upstream end. Similarly, annular shaped tube sheet 97 closes off annular passage 84 below its upper end. Conventional means i.e. welding, turning, crimping, threading, rolling may be employed to provide a pressure and gastight hermetic seal or joint where the central and annular bunches of tubes penetrate the respective tube sheets. Mechanical pressure fittings and coupling devices may be also employed.

Plate 108 which may be disc-shaped seals off the upper end of central conduit 81. The space between plate 108 and tube sheet 87 constitutes said central manifold 101. By this means, for example, a portion of a first reactant feedstream in feed pipe 102 may be introduced into central manifold 101 and then split into a plurality of streams which pass through tube sheet 87 and the individual tubes in central bundle 85. Annular shaped disc 109 seals off the upper end of annular passage 84. The space between annular disc 109 and annular tube sheet 97 constitutes annular manifold 100. Simultaneously and concurrently with the introduction of the first reactant feedstream, the third reactant feedstream in feed pipe 104 may be introduced into annular manifold 100, split into a plurality of streams which pass through tube sheet 97 and the individual tubes in annular bundle 95.

Wall brackets or tube spacers 115 hold the individual tubes in annular tube bundle 95 in a fixed parallel nontouching relationship with respect to each other, the inside of outer conduit 90, and the outside diameter of central conduit 81. Similarly, wall brackets or tube spacers 116 hold the individual tubes in central tube bundle 85 in a fixed parallel nontouching relationship with respect to each other and the inside diameter of central conduit 81.

While the pre-mix zones in the embodiment in FIG. 2 are shown as comprising two separate coaxial central pre-mix chambers 117 and 118 in series in central conduit 83, and two separate coaxial annular pre-mix chambers 119 and 120 in series in annular passage 84, the pre-mix zone of other embodiments of subject invention may actually comprise one or more, such as 2 to 5 coaxial central and/or annular pre-mix chambers. Each central pre-mix chamber, except for the first chamber in the line, comprises a coaxial cylindrical body portion 121 followed by a coaxial at least partially converging frusto-conical outlet portion 122 that may optionally develop into a normal cylindrical portion 123. This outlet portion is shown in FIG. 2 as a converging central nozzle 124 which terminates at the downstream face of the burner. Optionally, nozzles 124 and 133 to be further described may be made from a thermal and wear resistant material i.e. silicon carbide or tungsten carbide.

The first central pre-mix chamber in the line may have a straight coaxial cylindrical body portion 125, that discharges through circular orifice 126 directly into the next in line central coaxial pre-mix chamber 118. Preferably, the inlet to the first central pre-mix chamber 117 is a portion of a converging frusto-conical shaped section 127.

Each of the coaxial annular shaped pre-mix chambers 120 except the first annular shaped chamber 119 comprises a coaxial generated normal cylindrical annular body portion 130 followed by a coaxial generated at least partially converging frusto-conical shaped annular outlet portion 131 that may optionally develop into a coaxial generated normal cylindrical annular portion 132. This outlet portion is shown in FIG. 2 as a converging annular exit nozzle 133 which terminates at the downstream face of the burner. The first coaxial annular shaped pre-mix chamber 119 comprises a coaxial generated normal cylindrical annular body portion 134 that discharges through annular orifice 135 into the next in line coaxial annular shaped pre-mix chamber 120. Preferably, the inlet to the first annular shaped pre-mix chamber 119 comprises a portion of a coaxial generated converging frusto-conical shaped section 136.

Cored faceplate 107 comprises a front portion 137 at the extreme tip of the burner, which may be flat or curved, and which contains a coaxial central annular shaped cooling chamber 138 surrounding the central conduit exit nozzle 124 and/or a coaxial radially spaced annular shaped cooling chamber 139 surrounding said annular exit nozzle 133 at the tip of the burner. The cooling chamber may be joined to the otherwise flat burner tip such as shown in FIG. 1, or it may be an extension of the central and outer conduits. Cold cooling water in line 140 enters annular shaped cooling chamber 139, splits by means of baffles and flows about 180°, and leaves by way of an opposite outlet which is connected to outer coils 106. Cooling water is introduced into central annular cooling chamber 138 by way of line 145 which is connected to passage 146 that passes longitudinally down through wall 82 in central conduit 81. The cool water splits by means of baffles, flows about 180° around central cooling channel 138, and leaves by way of an opposite coaxial longitudinal passage (not shown) similar to passage 146 but in another location in wall 82.

Optionally, a gaseous feedstream selected from the group consisting of steam, free-oxygen containing gas, $CO_2$, $N_2$, fuel gas, recycle portion of the product gas, and mixtures thereof may be introduced into at least one of the central and/or annular pre-mix chambers by way of at least one inlet pipe 149 which is connected to at least one longitudinal passage 147 in wall 82 of central conduit 81, and at least one branch passage 148 connecting longitudinal passage 147 with said pre-mix chambers.

While the central bundle of tubes 85 and the annular bundle of tubes 95 are shown in FIG. 2 as comprising a plurality of parallel tubes, in another embodiment of the burner depicted in FIG. 5 of coassigned patent application Ser. No. 212,054 filed in the U.S. Patent and Trademark Office on Dec. 3, 1980 and which is incorporated herein by reference, the central and annular bundles of tubes may be helical shaped.

Although modifications and variations of the invention may be made without departing from the spirit and scope thereof, only such limitations should be imposed as are indicated in the appended claims.

We claim:

1. In a process for producing gaseous mixtures comprising $H_2$, CO, $CO_2$, entrained particulate carbon, and at least one material from the group consisting of $H_2O$, $N_2$, $H_2S$, COS, $CH_4$, Ar, and ash in a free-flow noncatalytic partial oxidation gas generator, the improvement employing a burner having a central section with separate first and second fluid passage means and an annular section with separate third and fourth fluid passage means, and changing from one reactant feedstream to another without shutting down or depressurizing the system comprising the steps of:

(1) passing a first reactant stream of first solid carbonaceous fuel slurry or hydrocarbonaceous fuel with or without mixture with $H_2O$ through either the first or second fluid passage means in the central section of said burner, and/or simultaneously passing a second reactant stream of said first solid carbonaceous fuel slurry or hydrocarbonaceous fuel with or without mixture with $H_2O$ through either the third or fourth fluid passage means in the annular section of said burner; wherein the central section of the burner includes a central conduit, said central conduit being closed at the upstream end and having an unobstructed downstream circular exit orifice at the tip of the burner; said annular section being bounded by an outer conduit coaxial and concentric with said central conduit along its length and in spaced relationship therewith and forming an annular passage therebetween, said annular passage being closed at the upstream end and having an unobstructed downstream annular exit orifice at the tip of the burner and wherein the central longitudinal axis of the annular passage is parallel to the central longitudinal axis of the burner throughout its length; said first passage means comprises a central bunch of tubes passing through the closed end of said central conduit and making a gastight seal therewith, and wherein the downstream ends of said central bunch of tubes are retracted upstream from the burner face a distance of about 0 to 12 times the minimum diameter of the central conduit exit orifice at the tip of the burner; said second passage means comprising the space between the inside wall of said central conduit and the outside surfaces of the central bunch of tubes; said third passage means comprising an annular bunch of tubes passing through the closed end of said annular passage and making a gastight seal therewith, and wherein the downstream ends of said annular bunch of tubes are retracted upstream from the burner face a distance of about 0 to 12 times the minimum width of the annular exit orifice at the tip of the burner; and said fourth passage means comprising the space between the inside wall of the outer conduit and the outside surfaces of the annular bunch of tubes;

(2) simultaneously passing a separate reactant stream of free-oxygen containing gas with or without mixture with a temperature moderating gas through the unused fluid passage means in each of the central and/or annular sections of said burner which are related to said fluid passage means through which said stream(s) of first solid carbonaceous fuel slurry or hydrocarbonaceous fuel with or without mixture with $H_2O$ are passing;

(3 mixing together said reactant streams from (1) and (2) to produce a well-distributed blend, and reacting said mixture by partial oxidation in the reaction zone of said gas generator at an autogenous temperature in the range of about 1700° to 3500° F., a pressure in the range of about 1 to 300 atmospheres, an atomic ratio of oxygen/carbon in the range of about 0.5 to 1.7, and a weight ratio $H_2O$/fuel in the range of about 0 to 5.0;

(4) replacing in said central and/or annular section(s) one or more of said reactant stream(s) of first solid carbonaceous fuel slurry or hydrocarbonaceous fuel with or without mixture with $H_2O$ with a replacement stream of a second carbonaceous fuel slurry or hydrocarbonaceous fuel with or without mixture with $H_2O$; and simultaneously with (4) or after completion of (4);

(5) controlling the temperature and weight ratio $H_2O$/fuel in the reaction zone at design conditions by adjusting the flow rate(s) of the reactant stream(s) of free-oxygen containing gas with or without mixture with a temperature moderating gas passing through the burner, and if necessary introducing supplemental $H_2O$ into the reaction zone.

2. The process of claim 1 where in step (5) the temperature in the reaction zone is maintained substantially constant and the weight ratio $H_2O$/fuel is maintained in the range of about 0.1 to 3.0.

3. The process of claim 1 provided with the added steps in (4) of phasing out of its fluid passage means each reactant stream of first solid carbonaceous fuel slurry or hydrocarbonaceous fuel with or without mixture with $H_2O$ being replaced in the central and/or annular section(s) of the burner, and simultaneously phasing into the same fluid passage means the replacement reactant stream of second solid carbonaceous fuel slurry or hydrocarbonaceous fuel with or without mixture with $H_2O$.

4. The process of claim 1 provided with the added steps in (4) of sequentially replacing each reactant stream of first solid carbonaceous fuel slurry or hydrocarbonaceous fuel with or without mixture with $H_2O$ flowing in said central and annular sections of the burner with a replacement reactant stream of second solid carbonaceous fuel slurry or hydrocarbonaceous fuel with or without mixture with $H_2O$.

5. The process of claim 1 wherein said reactant stream of first solid carbonaceous fuel slurry or hydrocarbonaceous fuel with or without $H_2O$ is flowing in one section of the burner only and provided with the added steps in (4) of introducing into the unused section of the burner a stream of said second solid carbonaceous fuel slurry or hydrocarbonaceous fuel with or without mixture with $H_2O$ and also a separate related reactant stream of free-oxygen containing gas with or without mixture with a temperature moderating gas.

6. The process of claim 5 provided with the additional step of stopping the flow of said reactant stream of first solid carbonaceous fuel slurry or hydrocarbonaceous fuel with or without $H_2O$ and its separate related reactant stream of free-oxygen containing gas with or without mixture with a temperature moderating gas simultaneously with or after the introduction of said second solid carbonaceous fuel slurry or hydrocarbonaceous fuel with or without mixture with $H_2O$.

7. The process of claim 1 provided with the additional steps in (4) of phasing out of the fluid passage means in which it is flowing in said central and/or annular section(s) said stream(s) of first solid carbonaceous fuel slurry or hydrocarbonaceous fuel with or without mixture with $H_2O$, said phasing out being with a uniformly decreasing rate of flow that varies from maximum to 0 over a period of time in the range of about 1–3600 seconds; and simultaneously phasing said stream(s) of second solid carbonaceous fuel slurry or hydrocarbonaceous fuel with or without mixture with $H_2O$ into the same fluid passage means at a uniformly increasing rate of flow that varies from 0 to maximum rate over the same period of time and mixing with the remaining portion of and replacing the phased out portion of said stream of first solid carbonaceous fuel slurry or hydrocarbonaceous fuel with or without mixture with $H_2O$ flowing therein.

8. The process of claim 1 wherein one section of the burner is unused and provided with the additional steps in (4) of phasing a stream of second carbonaceous fuel slurry or hydrocarbonaceous fuel with or without mixture with $H_2O$ and also the related stream of free oxygen containing gas with or without mixture with a temperature moderating gas into an unused section of the burner with a uniformly increasing rate of flow that varies from 0 to maximum over a period of time in the range of about 1–3600 seconds; and simultaneously phasing out the stream of first solid carbonaceous fuel slurry or hydrocarbonaceous fuel with or without mixture with $H_2O$ and also the related stream of free-oxygen containing gas with or without a temperature moderator from the other section of the burner with a uniformly decreasing rate of flow that varies from maximum to 0 within the same period of time.

9. The process of claim 8 provided with the additional step of simultaneously phasing a stream of second solid carbonaceous fuel slurry or hydrocarbonaceous fuel with or without mixture with $H_2O$ into the same fluid passage means at a uniformly increasing rate of flow that varies from 0 to maximum rate over the same period of time and mixing with the remaining portion of and replacing the phased out portion of said stream of first solid carbonaceous fuel slurry or hydrocarbonaceous fuel with or without mixture with $H_2O$, and adjusting the flow rate of the related stream of free-oxygen containing gas with or without mixture with a temperature moderating gas.

10. A method for controlling a partial oxidation process in which one reactant fuel stream is replaced by another without shutting down or depressurizing the system comprising the steps of:
(1) splitting into two separate feedstreams to produce feedstreams 1–8 each of the following four process feedstreams: steam, stand-by fuel, principal fuel, and free-oxygen containing gas;
(2) separately sensing the flow rates of feedstreams 1–8 and if present providing signals s, t, m, q, a, d, b and e corresponding respectively to the actual flow rates of feedstreams 1–8;
(3) comparing said actual flow rate signals s, t, m, q, a, d, b and e respectively with manual or automatically computed input signals representing the desired flow rate or set point for that moment for each of the eight feedstreams, and providing a corresponding adjustment signal for independently operating a flow rate control means for respectively controlling the flow rates of each feedstream 1–8 in accordance with the respective set point of each;
(4) passing one or more separate feedstreams of principal fuel through a burner and into the reaction zone of a free-flow noncatalytic partial oxidation gas generator, said burner comprising central and annular sections with first and second fluid passage means in the central section and third and fourth fluid passage means in the annular section, and one of said feedstreams of principal fuel is passed through either the first or second fluid passage means in the central section of the burner and/or simultaneously the other feedstream of principal fuel is passed through the third or fourth fluid passage means in the annular section; wherein the central section of the burner includes a central conduit, said central conduit being closed at the upstream end and having an unobstructed downstream circular exit orifice at the tip of the burner; said annular section being bounded by an outer conduit coaxial and concentric with said central conduit along its length and in spaced relationship therewith and forming an annular passage therebetween, said annular passage being closed at the upstream end and having an unobstructed downstream annular exit orifice at the tip of the burner and wherein the central longitudinal axis of the annular passage is parallel to the central longitudinal axis of the burner throughout its length; said first passage means comprises a central bunch of tubes passing through the closed end of said central conduit and making a gastight seal therewith, and wherein the downstream ends of said central bunch of tubes are retracted upstream from the burner face a distance of about 0 to 12 times the minimum diameter of the central conduit exit orifice at the tip of the burner; said second passage means comprising the space between the inside wall of said central conduit and the outside surfaces of the central bunch of tubes; said third passage means comprising an annular bunch of tubes passing through the closed end of said annular passage and making a gastight seal therewith, and wherein the downstream ends of said annular bunch of tubes are retracted upstream from the burner face a distance of about 0 to 12 times the minimum width of the annular exit orifice at the tip of the burner; and said fourth passage means comprising the space between the inside wall of the outer conduit and the outside surfaces of the annular bunch of tubes;
(5) simultaneously passing a separate feedstream of free-oxygen containing gas and if necessary a separate feedstream of steam through the unoccupied fluid passage means in each of the central and/or annular sections of said burner which are associated with said fluid passage means through which said stream(s) of principal fuel are passing;
(6) mixing together said reactant streams from (4) and (5) to produce a well-distributed blend, and reacting said mixtures by partial oxidation in the reaction zone of said gas generator at an autogenous temperature in the range of about 1700° to 3500° F., a pressure in the range of about 1 to 300 atmospheres, an atomic ratio of oxygen/carbon in the range of about 0.5 to 1.7, and a weight ratio $H_2O$/fuel in the range of about 0 to 5.0;
(7) replacing in said central and/or annular section(s) one or more of said feedstreams of principal fuel with a replacement feedstream of stand-by fuel; and simultaneously with or after the completion of said replacement;
(8) controlling the temperature and weight ratio $H_2O$/fuel in the reaction zone at design conditions by adjusting the flow rate(s) of the feedstream(s) of free-oxygen containing gas passing through the burner, and if necessary introducing supplemental $H_2O$ into the reaction zone.

11. The process of claim 10 provided with the additional steps in (7) of phasing out of the fluid passage means in which it is flowing in said central and/or annular section(s) said stream(s) of principal fuel comprising first solid carbonaceous fuel slurry or hydrocarbonaceous fuel, said phasing out being with a uniformly decreasing rate of flow that varies from maximum to 0 over a period of time in the range of about 1–3600 seconds; and simultaneously phasing said stream(s) of stand-by fuel comprising second solid carbonaceous fuel slurry or hydrocarbonaceous fuel into the same fluid passage means at a uniformly increasing rate of flow that varies from 0 to maximum rate over the same period of time and mixing with the remaining portion of and replacing the phased out portion of said stream of first solid carbonaceous fuel slurry or hydrocarbonaceous fuel.

12. The method of claims 10 or 11 wherein said process feedstreams of stand-by fuel and/or principal fuel may be in admixture with $H_2O$ and/or said process feedstream of free-oxygen containing gas may be in admixture with a temperature moderating gas selected from the group consisting of $H_2O$, $CO_2$, $N_2$, cooled and cleaned effluent gas from the gas generator, and mixtures thereof.

13. In a process for producing gaseous mixtures comprising $H_2$, CO, $CO_2$, entrained particulate carbon, and at least one material from the group consisting of $H_2O$, $N_2$, $H_2S$, COS, $CH_4$, $A_r$, and ash in a free-flow noncatalytic partial oxidation gas generator, the improvement for starting up and operating the gas generator by employing a two-section burner having a central section and an annular section with two separate fluid passage means in each section, and changing from one reactant feedstream to another without shutting down or depressurizing the system comprising the steps of:

(1) passing a first reactant stream of gaseous or liquid hydrocarbonaceous fuel with or without mixture with $H_2O$ through either the first or second fluid passage means in the central section of said burner, and/or simultaneously passing a second reactant stream of gaseous or liquid hydrocarbonaceous fuel with or without mixture with $H_2O$ through either the third or fourth fluid passage means in the annular section of said burner; wherein the central section of the burner includes a central conduit, said central conduit being closed at the upstream end and having an unobstructed downstream circular exit orifice at the tip of the burner; said annular section being bounded by an outer conduit coaxial and concentric with said central conduit along its length and in spaced relationship therewith and forming an annular passage therebetween, said annular passage being closed at the upstream end and having an unobstructed downstream annular exit orifice at the tip of the burner and wherein the central longitudinal axis of the annular passage is parallel to the central longitudinal axis of the burner throughout its length; said first passage means comprises a central bunch of tubes passing through the closed end of said central conduit and making a gastight seal therewith, and wherein the downstream ends of said central bunch of tubes are retracted upstream from the burner face a distance of about 0 to 12 times the minimum diameter of the central conduit exit orifice at the tip of the burner; said second passage means comprising the space between the inside wall of said central conduit and the outside surfaces of the central bunch of tubes; said third passage means comprising an annular bunch of tubes passing through the closed end of said annular passage and making a gastight seal therewith, and wherein the downstream ends of said annular bunch of tubes are retracted upstream from the burner face a distance of about 0 to 12 times the minimum width of the annuar exit orifice at the tip of the burner; and said fourth passage means comprising the space between the inside wall of the outer conduit and the outside surfaces of the annular bunch of tubes;

(2) simultaneously passing a separate reactant stream of air with or without mixture with $H_2O$ through the unoccupied fluid passage means in each of the central and/or annular sections of said burner which are associated with said fluid passage means through which said stream(s) of first gaseous or liquid hydrocarbonaceous fuel with or without mixture with $H_2O$ are passing;

(3) mixing together said reactant streams from (1) and (2) to produce a well-distributed blend, and burning said mixtures by substantially complete combustion in the reaction zone of said gas generator at a temperature in the range of about 2000° to 4500° F. and a pressure in the range of about 0.5 to 300 atmospheres;

(4) replacing in said central and/or annular section(s) each of said reactant stream(s) of first gaseous or liquid hydrocarbonaceous fuel with or without mixture with $H_2O$ with a replacement stream of a principal carbonaceous fuel slurry or hydrocarbonaceous fuel with or without mixture with $H_2O$; and simultaneously replacing the stream(s) of air flowing in each fluid passage associated with each of said reactant stream(s) of first gaseous or liquid hydrocarbonaceous fuel with or without $H_2O$ with a replacement stream of oyxgen enriched air or substantially pure oxygen with or without mixture with $H_2O$; and (5) controlling the temperature and weight ratio $H_2O$/fuel in the reaction zone at design conditions for partial oxidation by adjusting the flow rate(s) of the reactant stream(s) of oxygen enriched air or substantially pure oxygen with or without mixture with $H_2O$ passing through the burner, and if necessary introducing supplemental $H_2O$ into the reaction zone.

14. The process of claim 13 provided with the additional steps in (4) of phasing out of the fluid passage means in which it is flowing in said central and/or annular section(s) said stream(s) of first gaseous or liquid hydrocarbonaceous fuel with or without mixture with $H_2O$, said phasing out being with a uniformly decreasing rate of flow that varies from maximum to 0 over a period of time in the range of about 1–3600 seconds; simultaneously phasing said stream(s) of principal solid carbonaceous fuel slurry or hydrocarbonaceous fuel with or without mixture with $H_2O$ into the same fluid passage means at a uniformly increasing rate of flow that varies from 0 to maximum rate over the same period of time and mixing with the remaining portion of and replacing the phased out portion of said stream of first solid carbonaceous fuel slurry or hydrocarbonaceous fuel with or without mixture with $H_2O$ flowing therein; simultaneously phasing out of the fluid passage means in which it is flowing in said central and/or annular section(s) said stream(s) of air with or without mixture with $H_2O$, said phasing out being with a uniformly decreasing rate of flow that varies from maximum to 0 over a period of time in the range of about 1–3600 seconds; and simultaneously phasing said replacement stream(s) of oxygen enriched air or substantially pure oxygen with or without mixture with $H_2O$ into the same fluid passage means at a uniformly increasing rate of flow that varies from 0 to maximum rate over the same period of time and mixing with the remaining portion of and replacing the phased out portion of said stream of air with or without mixture with $H_2O$ flowing therein.

15. The process of claims 1 or 13 in which said hydrocarbonaceous fuel is a pumpable slurry of a solid carbonaceous fuel in a liquid carrier from the group consisting of water, liquid hydrocarbon fuel, and mixtures thereof.

16. The process of claim 15 wherein said solid carbonaceous fuel is selected from the group consisting of coal, lignite, coke from coal, char from coal, coal liquefaction residues, particulate carbon, petroleum coke, solids derived from oil shale, tar sands and pitch, concentrated sewer sludge, bits of garbage, rubber, and mixtures thereof.

17. The process of claims 1 or 3 in which said hydrocarbonaceous fuel is a liquid hydrocarbon selected from the group consisting of liquefied petroleum gas, petroleum distillates and residua, gasoline, naphtha, kerosine, crude petroleum, asphalt, gas oil, residual oil, tar-sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof.

18. The process of claims 1 or 13 in which said hydrocarbonaceous fuel is an oxygenated hydrocarbonaceous organic material from the group consisting of carbohydrates, cellulosic materials, aldehydes, organic acids, alcohols, ketones, oxygenated fuel oil, waste liquids and by-products from chemical processes for oxygenated hydrocarbonaceous organic materials, and mixtures thereof.

19. The process of claims 1 or 13 in which said hydrocarbonaceous fuel is a gaseous feedstock from the group consisting of ethane, propane, butane, pentane, methane, natural gas, coke-oven gas, refinery gas, acetylene tail gas, ethylene off-gas, and mixtures thereof.

20. The process of claims 1 or 13 in which said free-oxygen containing gas is selected from the group consisting of air, oxygen-enriched-air i.e. greater than 21 mole % $O_2$, and substantially pure oxygen, i.e. greater than about 95 mole % oxygen.

* * * * *